United States Patent
Herzberg

(10) Patent No.: US 8,240,762 B2
(45) Date of Patent: Aug. 14, 2012

(54) SINGLE, MULTIPLE AND INTEGRATED CAR SEAT SYSTEMS

(75) Inventor: Louis Paul Herzberg, Monsey, NY (US)

(73) Assignee: Louis Herzberg, Monsey, NY (US)

( * ) Notice: Subject to any disclaimer, the term of this patent is extended or adjusted under 35 U.S.C. 154(b) by 18 days.

(21) Appl. No.: 13/022,183

(22) Filed: Feb. 7, 2011

(65) Prior Publication Data
US 2011/0133533 A1 Jun. 9, 2011

Related U.S. Application Data

(63) Continuation-in-part of application No. 12/701,186, filed on Feb. 5, 2010, now Pat. No. 7,883,149.

(60) Provisional application No. 61/266,429, filed on Dec. 3, 2009.

(51) Int. Cl.
A47D 1/10 (2006.01)
A47C 3/04 (2006.01)

(52) U.S. Cl. ............... 297/256.16; 297/250.1; 297/239; 297/248

(58) Field of Classification Search .......... 297/239, 297/250.1–256.17, 481
See application file for complete search history.

(56) References Cited

U.S. PATENT DOCUMENTS

| | | | | |
|---|---|---|---|---|
| 4,275,923 A * | 6/1981 | Molnar | 297/250.1 |
| 4,461,510 A * | 7/1984 | Cunningham et al. | 297/250.1 |
| 4,463,984 A * | 8/1984 | Molnar | 297/250.1 |
| D276,764 S * | 12/1984 | Shipman et al. | D6/338 |
| 4,662,678 A * | 5/1987 | Halpert | 297/239 |
| 4,718,717 A * | 1/1988 | Cruz | 297/232 X |
| 4,867,504 A * | 9/1989 | Johnson, Jr. | 297/239 X |
| 5,033,761 A * | 7/1991 | Kelly | 297/248 X |
| 5,344,212 A * | 9/1994 | Muller et al. | 297/250.1 X |
| 5,518,293 A * | 5/1996 | Coy et al. | 297/248 |
| 5,797,654 A * | 8/1998 | Stroud | 297/250.1 X |
| 5,845,876 A * | 12/1998 | Zach, Sr. | 297/256.16 X |
| 5,927,805 A * | 7/1999 | Hilger et al. | 297/239 |
| 5,997,085 A * | 12/1999 | MacLiver | 297/248 |
| D422,798 S * | 4/2000 | Holland | D6/338 |
| 6,070,936 A * | 6/2000 | Holland | 297/232 |
| 6,250,653 B1 * | 6/2001 | Worrell | 280/47.38 |
| 6,260,903 B1 * | 7/2001 | von der Heyde | 297/256.16 X |
| 6,322,143 B2 * | 11/2001 | Kassai et al. | 297/250.1 |
| 6,491,343 B2 * | 12/2002 | Yamazaki | 297/250.1 |
| 6,676,213 B1 * | 1/2004 | Dlugos | 297/250.1 X |
| 6,997,509 B2 * | 2/2006 | Kain | 297/250.1 |
| 7,011,368 B2 * | 3/2006 | Barth et al. | 297/239 |
| 7,344,193 B1 * | 3/2008 | Carrier et al. | 297/248 |
| 7,407,226 B2 * | 8/2008 | Macliver | 297/248 X |

(Continued)

*Primary Examiner* — Rodney B White
(74) *Attorney, Agent, or Firm* — Louis P. Herzberg

(57) ABSTRACT

Apparatus for single and multiple person vehicle car seats, specialized car seats, modular car seat systems, integrated car seats, dual person car seats, variable width car seats, reversibly and non-reversibly changeable car seat types, car seat-inserts inserted into a car seat, and overlapping car seats, for use in a land, sea or air vehicle, mounted onto the vehicle's built-in seat and used for securing a car seat user, such as an infant or older child or handicapped person, within a vehicle's regular seating positions. Car seat systems include components enabling addition or removal of seating positions for a desired number of car seat users as needed, limited only by available width space of the vehicle seat onto which it is mounted. Car seat systems, integrated car seat systems and/or multiple person car seats generally provide more and/or specialized seating positions for persons in car seats than provided for regular passengers in the vehicle width space taken up by the car seat systems or the multiple person car seat.

45 Claims, 21 Drawing Sheets

U.S. PATENT DOCUMENTS

| | | | |
|---|---|---|---|
| 7,794,015 B1* | 9/2010 | Ashby | 297/248 |
| 7,883,149 B1* | 2/2011 | Weiss et al. | 297/256.16 |
| 2006/0163921 A1* | 7/2006 | Macliver | 297/248 |
| 2007/0108812 A1* | 5/2007 | Haun et al. | 297/248 |
| 2007/0236061 A1* | 10/2007 | Meeker et al. | 297/250.1 |
| 2008/0217972 A1* | 9/2008 | Foster et al. | 297/250.1 |
| 2010/0084901 A1* | 4/2010 | Flannery et al. | 297/250.1 |
| 2011/0291450 A1* | 12/2011 | Gillett et al. | 297/250.1 |

\* cited by examiner

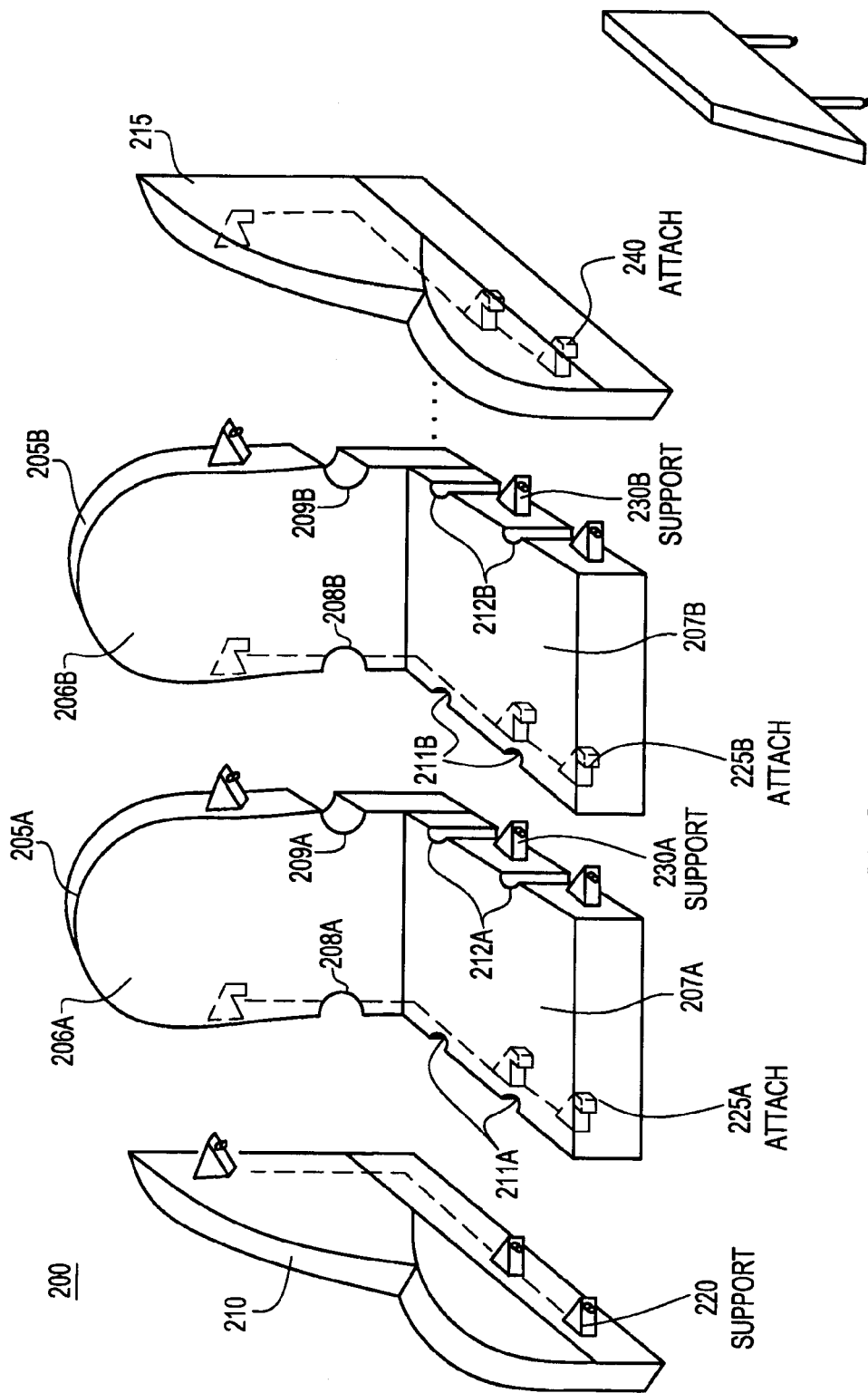

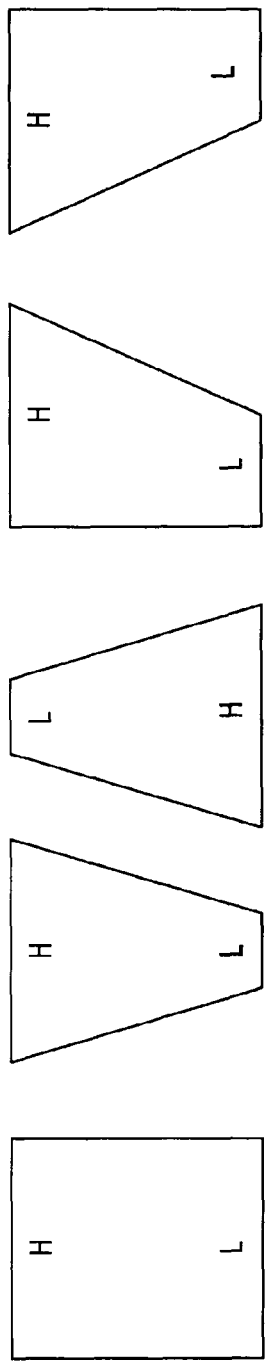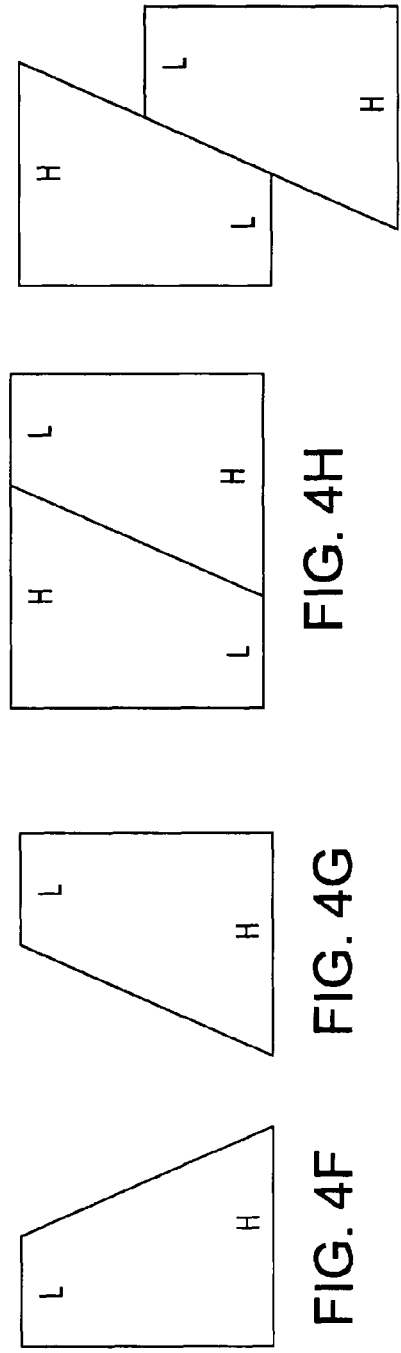

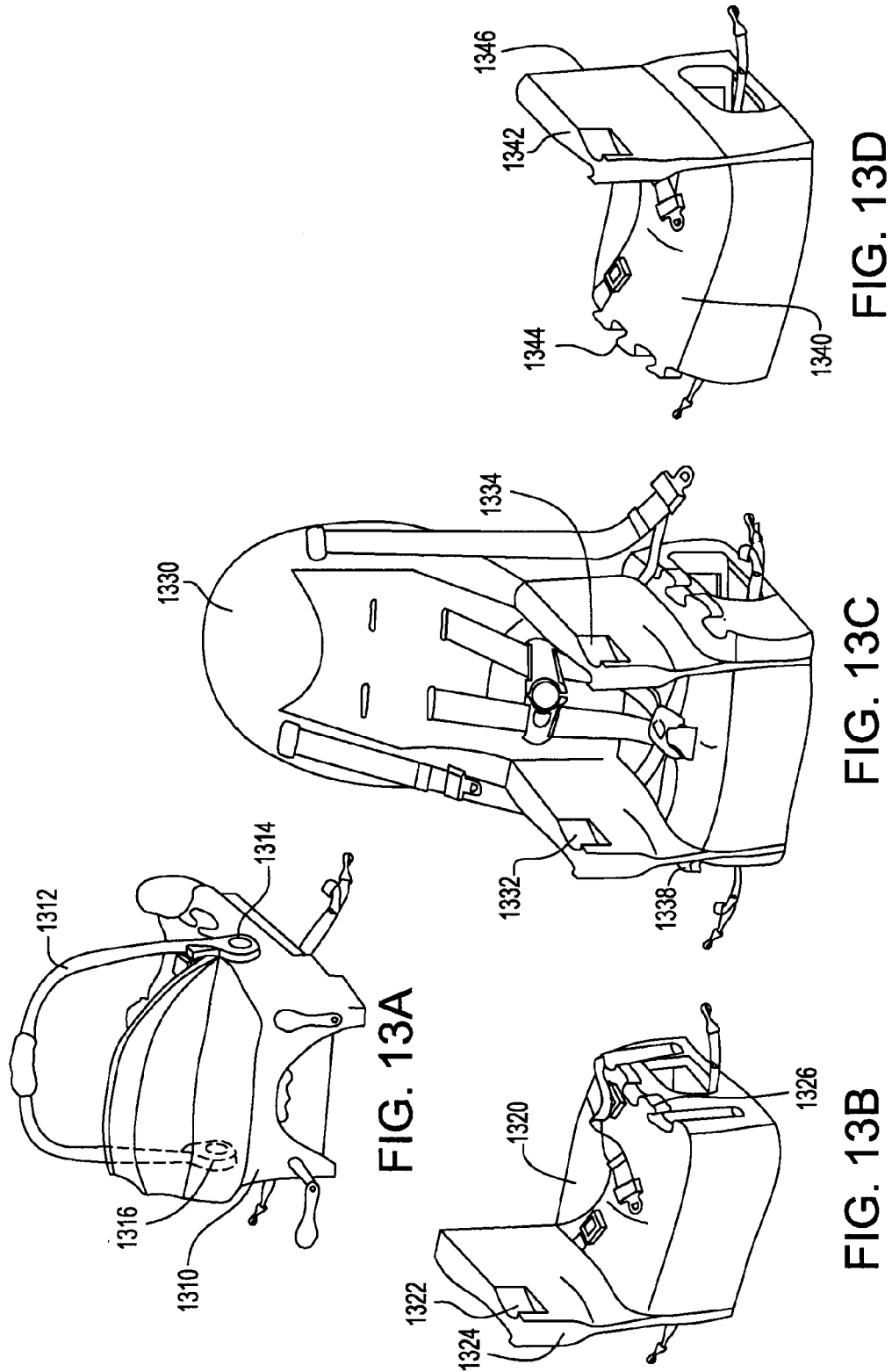

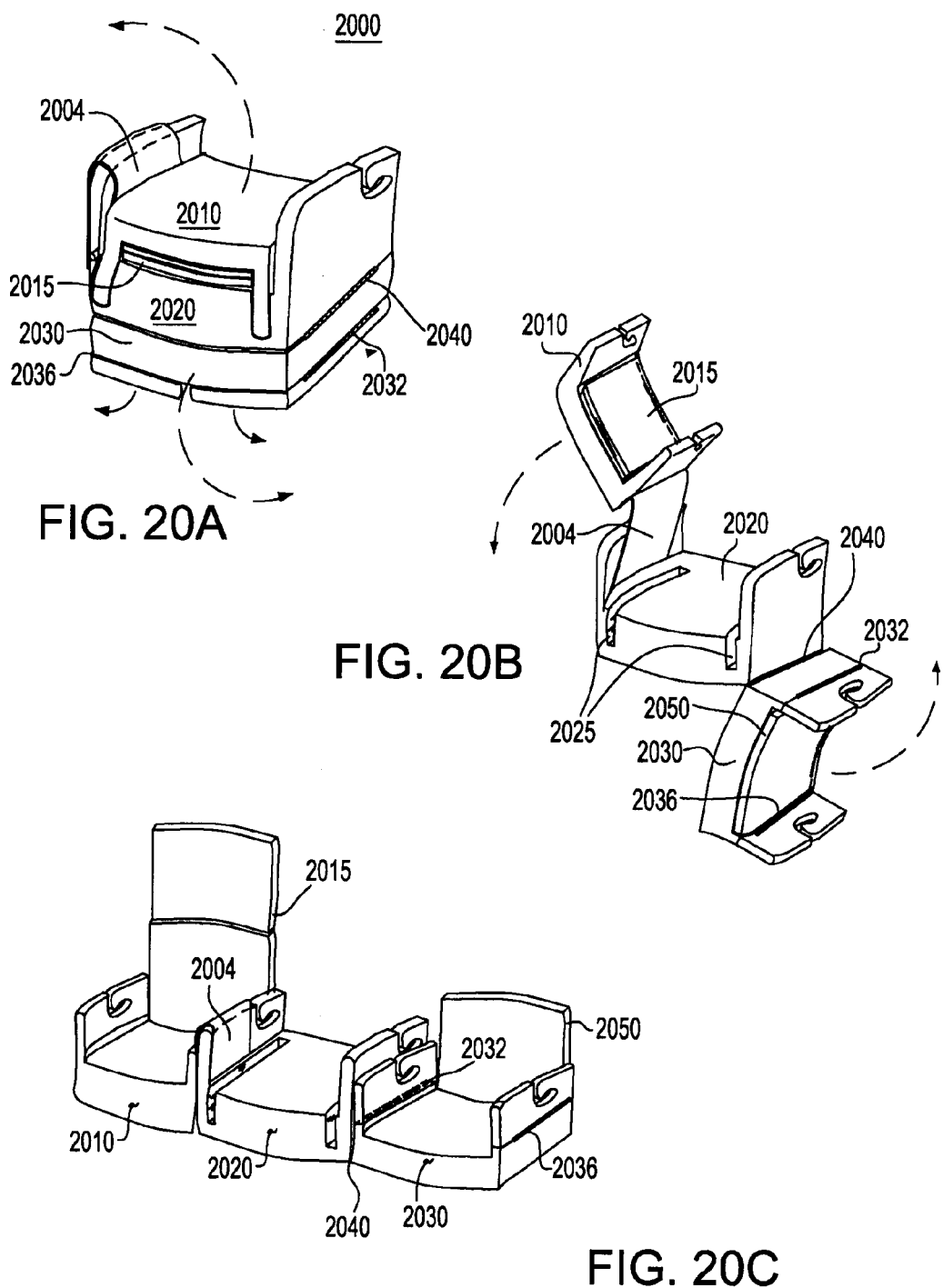

SINGLE, MULTIPLE AND INTEGRATED CAR SEAT SYSTEMS

PRIORITY

This application claims priority from U.S. Provisional Application filed Dec. 3, 2009 entitled "Multiple Person Car Seat," assigned Ser. No. 61/266,429, and US Application filed Feb. 5, 2010, entitled "Multiple Person Car Seat," assigned Ser. No. 12/701,186 now U.S. Pat. No. 7,883,149 B2.

FIELD OF THE INVENTION

The present invention relates to apparatus and methods for single and multiple person vehicle car seats and specialized car seats. More particularly, but not exclusively, it relates to apparatus and methods for a car seat system, a dual person car seat, overlapping car seats, changeable car seats, insertable car seats, an integrated car seat system, variable width car seats and multiple person car seats.

BACKGROUND OF THE INVENTION

The present invention is concerned with special vehicle seats. Heretofore, each vehicle car seat was a small removable seat generally equipped with a restraining device or harness and can be fastened to the seat of a vehicle for securing a person in the vehicle. Most often it is a seat that is portable for use in the automobile and fastens onto a car's built-in seat and is used for securing a small child in a car's regular seating position. The seat is removable and is designed to hold the small child safely while riding in the automobile and attaches to a standard seat with hooks or straps and detaches from the standard seat by unhooking the hooks and straps. As referred to herein, the term 'car seat' includes a 'car booster seat', generally used for a child who has outgrown both an infant car seat and a toddler car seat and lifts the child by several inches. As with an infant car seat, a booster seat is placed on a vehicle adult seat and is designed to restrain the child in the booster seat employing the built-in adult seat belt of the vehicle. A booster seat is generally recommended for children from 40 to 80 pounds. Many booster seats are designed without a back and the child seated on it is lifted by several inches and restrained employing an adult built-in seat belt.

Herein, a person using and/or needing a car seat is referred to as a car seat user. Also, although reference is made to infants, toddlers and/or children, this invention is applicable to any car seat user that uses and/or needs a car seat when traveling in a land, sea or air vehicle. Thus the term 'car seat' is used for a removable vehicle seat generally equipped with a restraining device or harness and can be fastened to the seat of a vehicle for securing a person in the vehicle.

It is noted that when seating is required for a plurality of car seat users, a separate car seat is needed for each car seat user. Thus each car seat user uses up a separate regular seat built into the vehicle. Thus a family or group including a plurality of children and/or other car seat users is limited in seating capacity by the adult seating capacity of the vehicle being used. This limitation manifests itself as a serious problem for large families and/or groups that find it difficult to meet children car seat needs for all their children or to meet the needs of car seat users of the group. These families must either not meet car seating requirements or leave one or more children out of the vehicle. It would be advantageous to find a way to better utilize the adult seating capacity in a vehicle to provide more seating for persons in car seats than is provided by the vehicle's adult seating capacity. Besides cars, this may be particularly useful in vans, buses or other land, water or air vehicles.

Definition of Terms

For purposes of this invention:
- the term 'person' is used for anyone whether the person be an infant or an aged senior;
- the term 'adult seat belt' is a seat belt built-in to a vehicle for use by an adult passenger;
- the term 'car seat right side' is used to refer to a car seat dimension running along a right hand side, head to foot, of a person using the car seat when the person is seated in the manner known for an ordinary car seat;
- the term 'car seat left side' is used to refer to a car seat dimension running along a left hand side, head to foot, of a person using the car seat when the person is seated in the manner known for an ordinary car seat;
- the term vehicle is used to include any land air or water vehicle;
- the term vehicle 'space width', 'width space' or 'width' is used for the seat space allocated to a passenger of the vehicle from the passenger's right hand to the passenger's left hand;
- the term 'vehicle seat' is a seat in a vehicle which provides seating for one or more regular passengers;
- the term 'vehicle rear' refers to the end of the car closest to the rear tires;
- the term 'vehicle front' refers to the end of the car closest to the front tires;
- the term 'car seat user' refers to any person using and/or needing a car seat;
- the term 'car seat person' refers to any person using and/or needing a car seat;
- the term 'adult seat' refers to a regular seating position in the vehicle designed to seat an adult;
- the term 'booster seat' is a seat that can be placed on a vehicle seat, for seating a child who has outgrown both an infant car seat and a toddler car seat and lifts the child by several inches, and is designed to restrain the child employing an adult seat belt; and
- the term 'regular passenger' refers to a vehicle passenger such as an adult not requiring seating in a car seat.

SUMMARY OF THE INVENTION

It is therefore an object of the invention to obviate and/or mitigate disadvantages associated with the use of heretofore conventional car seats in vehicles carrying one or more persons needing use of a car seat when seated in a vehicle.

In a first aspect of the present invention a novel multiple person car seat is provided. The multiple person car seat is such as to provide more proper sitting positions in a vehicle than are provided by the vehicle capacity for persons not in a car seat. Thus, vehicle passenger space widths that are provided for 1, 2, 3 or 4 passengers are used to provide, 2, 3, 4, 5 or more persons respectively, in a multiple person car seat as described below.

In some embodiments of a multiple person car seat, the multiple person car seat uses similar or even greater car width space for car seat users than it takes up for regular the car seat users. In these cases it generally provides more room and comfort advantages than a multiplicity of individual car seats.

In a second aspect of the present invention there is provided a car seat system. The car seat system is modular to enable provision of a desired number of seats for car seat users that are needed and/or fit in the vehicle car seat in which it is incorporated.

In a particular embodiment, the car seat system includes a first car seat right end, a first car seat left end, and a first car seat center. The first car seat center includes a first car seat back, a first car seat base. The first car seat right end includes a support mechanism, designed to accept an attachment mechanism of the right periphery of the first car seat center. The left periphery of the first car seat center includes a support mechanism to accept an attachment mechanism of the first car seat left end when the system is used for a single person. When the car seat system is used for two persons, the support mechanism of the left periphery of the first car seat center accepts an attachment mechanism of a second car seat right end. When the car seat system is used for three persons, the support mechanism of the left periphery of the second car seat center accepts an attachment mechanism of a third car seat right end, and so on. The support mechanism of the left most car seat center accepts an attachment mechanism of the first car seat right end. In some embodiments car seat centers are divided by a separator. The number of car seat centers in a car seat system is limited by the vehicle seat width made available to the car seat system. The car seat system employs at least one adult seat belt male and female connector combination of the vehicle.

In another aspect of the present invention, in a particular embodiment the second car seat center also employs a seat belt of the vehicle. In some cases this may be the same seat belt employed by the first car seat. In some cases this requires use of a seat belt extender to properly restrain the first and second car seats. In some cases there is provided a special seat belt for each car seat to restrain the person in that car seat.

In a further aspect of the present invention, the first and second car seats centers are designed such that when attached together by the support and attachment mechanisms the combined attach seats with car seat right and left ends use a vehicle seat width generally allocated to a single vehicle passenger.

In another aspect of the present invention, the first car seat is designed for a person to face the back of the adult seat and the second car seat is designed for a person to face the front of the adult seat so that the car seat users face each other. The users sit face-to-face. Preferably, each car seat is designed such that the portion of the car seat holding the main body of the person in the seat is wider than the portion of the car seat provided for the legs of the person in that seat. In this way car seat centers have overlapping base portions so as to use a lesser amount of total vehicle seat width space. In general the second car seat center has a second support mechanism to accept a second attachment mechanism of a third car seat center. When the second attachment is coupled to the second support mechanism the second car seat center is in-between the first car seat and third car seat centers.

It is preferable that the vehicle width taken up by the three seat combination [when both car seat 2 and car seat 3 are attached to car seat 1] is no more than the width space taken up by two adjacent adult passenger seats seating two persons without a car seat. In some embodiments, the seating directions of adjacent car seats have the car seat persons facing each other.

It is preferable that both car seat 2 and car seat 3 be designed so that when a person in car seat 2 faces the front of the vehicle seat, the persons in car seats 1 and 3 face the back of the vehicle seat, and when the person in car seat 2 faces the back of the vehicle seat, the persons in car seats 1 and 3 face the front of the vehicle seat.

In a further aspect this invention includes a multiple person car seat. The multiple person car seat is generally designed to provide more seating positions in the vehicle for persons in the multiple person car seat than would be available for persons not in the multiple person car seat.

A two person multiple person car seat is preferably designed to use a vehicle width generally allocated for a single passenger. Three and four multiple person car seats are preferably designed to use a vehicle width allocated for two vehicle passengers not seated in a car seat.

A four or five multiple person car seat is preferably designed to take up a vehicle width allocated for three passengers not seated in a car seat, and so on. Generally, in each design a multiple person car seat generally provides more seating for car seat users than is provided by the vehicle for adult non car seat users, but not in all cases.

In some embodiments, the number of car seat users provided for by the multiple person car seat and/or car seat system is equal to the number of adult car seat users in the same vehicle space width.

As stated, it is preferable that the multiple person car seat be designed such that the seating position of adjacent seats face opposite ends of the vehicle seat. For example, a four person multiple person car seat having seating for a first, second, third and fourth person would provide seating of the first and third persons to face the front of the vehicle car seat, and the seating of the second and fourth persons to face the rear of the vehicle car seat or vice versa. In each case it is preferable that each seating position provides more vehicle width for the body of the person using that seating position than it provides for the leg of that person. This would result in better utilization of the vehicle width space, and would enable more passengers in the vehicle than the vehicle width space allows without the multiple person car seat. The same applies to the car seat system described herein.

Each multiple person car seat generally employs at least a vehicle seat belt to fasten the multiple person car seat to the vehicle. In some cases a seat belt extender is employed together with the vehicle seat belt(s). It is preferable that each seating position have a restraining belt to hold the person in that seating position.

In a further aspect of this invention, in some embodiments adjacent car seats portions are mountable adjustably to use up width not taken by a person in an adjacent car seat portion. Thus, a base of a second car seat uses up a portion of a car seat width available to a first car seat base that is not taken up by a car seat person in the first car seat base of an adjacent car seat. A portion of the second car seat base overlaps a portion of the adjacent first car seat base.

In a still further aspect of the present invention, still more efficient use of vehicle car seat width space is achieved in embodiments having two car seats with users facing each other being seated essentially in a same width space. In these cases two car seats users take up a common portion of vehicle width space that is ordinarily used for a single car seat user. This type of a car seat is herein referred to as a car seat entity for one or more 'dual person car seats'. A 'dual person car seat' can be used as a standalone car seat, a portion of a 'multiple person car seat', or as a component of a car seat system.

In a still further aspects of the present invention, there is provided integrated car seat systems enabling storage of a plurality of removably attached car seats on top of one another until needed for use.

In still further aspects of the present invention, there are provided descriptions, advantages and embodiments for dual person car seats, overlapping car seats, changeable car seats, insertable car seats, variable width car seats and multiple person car seats. Some embodiments use a combination of the novelties described herein

BRIEF DESCRIPTION OF THE DRAWINGS

The foregoing and further features of the present invention will be more readily understood from the following description of advantageous embodiments, by way of example only, with reference to the accompanying [not to scale]drawings, in which:

FIG. 2 is a schematic diagram of car seat system in accordance with the present invention;

FIG. 3 is a schematic diagram of a car seat center separator in accordance with the invention;

FIGS. 4A-4J show diagrams of examples of different seat base designs and different seat base combinations in accordance with the invention;

FIGS. 13A-E show embodiment of providing one or more car seats with the ability to accept a car seat insert in accordance with the present invention;

FIGS. 20A, 20B and 20C show another example embodiment of integrated car seat systems having car seats that unfold from one another in accordance with the present invention.

DESCRIPTION OF THE INVENTION

Figure 1A:
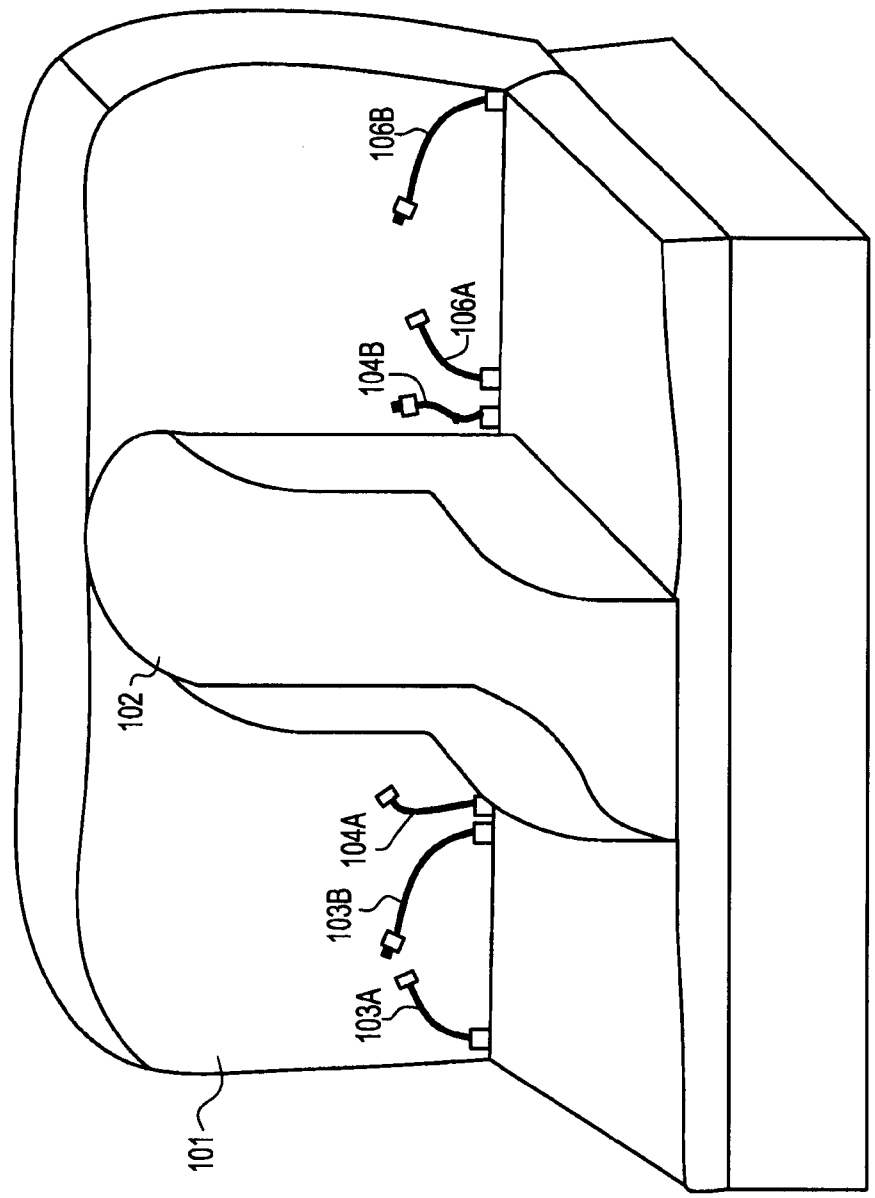
FIG. 1A is a diagram of a prior art basic car seat positioned in a vehicle adult seat, a vehicle seat for three adults.

The present invention obviates and/or mitigates disadvantages associated with known vehicle car seats. Heretofore, all known car seats provided car seat seating for a single person. Each car seat used-up the vehicle space width allocated to an adult seat. This is disadvantageous to large families or groups that include a plurality of persons needing use of a car seat when seated in a vehicle. This invention provides for car seat systems and/or multiple person car seats that provide more seating positions for persons in a car seat than provided for adults in the car width taken up by the car seats, and/or better seating for car seat users, especially for seating multiple car seat persons in a vehicle.

This invention also provides an integrated car seat system. Often car seats are large and relatively clumsy packages to store with other storage items in a vehicle. Sometimes car seats are mounted in the vehicle even when not all car seats are used. This unnecessarily limits seating of regular vehicle passengers. An integrated car seat system solves this problem by only providing and using car seat position when actually needed by a car seat user. It also eleviates the problem of storing unused car seats in the vehicle storage when these are unused.

The integrated system is formed to provide two or more car seat being colocated on top of one another. Car seats within an intergrated system are removably attached to one another. When the integrated system is in a closed state, it provides a single sitting position for a singular car seat user sitting in a first car seat of the integrated system. When a second sitting position is needed for a second car seat user, a second car seat is separated from the integrated system. If a third car seat is included in the integrated system, that car seat is separated out from the first and/or second car seat to provide a seating position for a third car seat user, etc.

In general, the car seats systems, the integrated car seat systems and/or multiple person car seats of the present invention may provide any or all of the amenities of previously known car seats. The present invention is thus useable to provide features and general aspects of standard prior and developing car seat technology. It is upon this technology that the present invention is providing special features described herein.

In the following the words 'right' and 'left' are used to facilitate understanding of embodiments presented herein. This is not to be considered a needed limitation, and 'right' and 'left' may be interchanged in accordance with a particular implementation. The particular implementations are only exemplary enablements, in so much that the concepts and advantages may be achieved by other implementations which are also deemed to be included and protected by the claims of this invention.

In a first embodiment, the present invention provides novel vehicle seating systems. A car seat system is modular to enable provision of the number of seats for car seat users that fit in the vehicle car seat in which it is incorporated. This enables purchasers to purchase that portion needed at a particular time. Additional or replacement portions of the system may be purchased for example as a family size increases.

The novel car seat systems are generally such as to provide more proper sitting positions in a vehicle than are provided by the vehicle for persons not in a car seat. Thus, vehicle passenger space widths that are provided for 1, 2, 3 or 4 passengers are used to provide, 2, 3, 4, 5 or more persons in a multiple person car seat as described in this description. This overcomes problems with the present state of the art of using a car seat to provide seating for example an infant or a child within the same car width provided for an adult passenger. There are many large families, or family groups traveling together in one vehicle for whom the one-to-one passenger space width allocation does not provide sufficient safe and proper seating for the entire family and/or group.

In some embodiments multiple person car seat provides for seating of the same number of car seat users as provided for regular seat users without the adjacent walls inherent to two or three prior art adjacent car seats. In some embodiments a separator is provided between adjacent car seat portions to provide some separation of adjacent car seat persons.

FIG. 1A, shows a basic prior art car seat 101 in a center adult seating position of a typical vehicle seat 102 for seating three adults. Car seats are made in many different ways. Many of these are known to those in the art. The seating portion 102 shown in FIG. 1A is purposely shown for its simplicity without any of the many features of some currently available car seats, in as much that these are generally not of particular concern to the present invention. Vehicle seat 101 includes seat belt pairs 103A 103B, 104A 104B and 106A 106B. Pair 104A 104B is used to mount car seat 102 into vehicle seat 101. The seat is non-modular and provides seating for one car seat user.

Figure 1B:
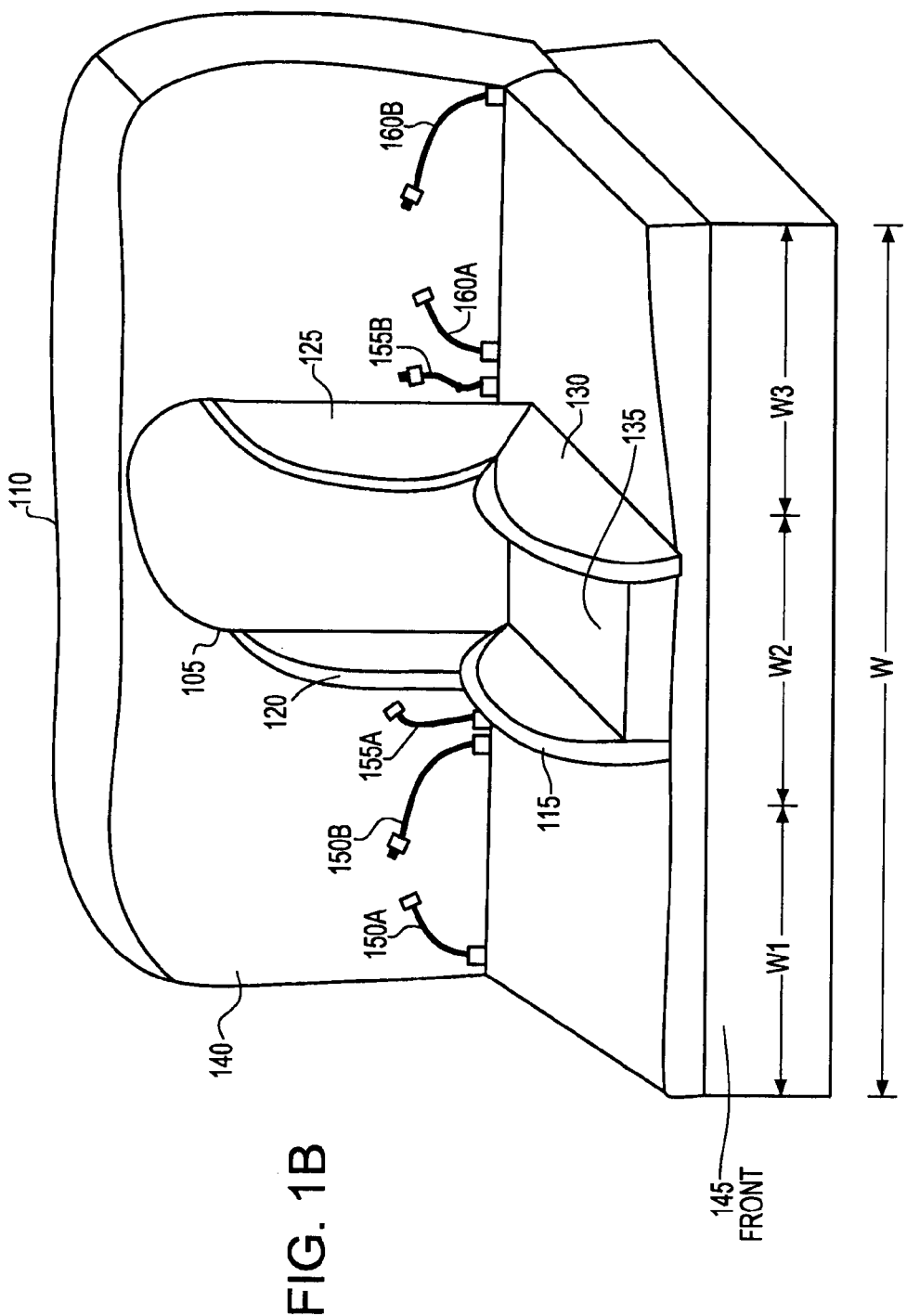
FIG. 1B is a diagram of a modular one person car seat in accordance with the present invention.

FIG. 1B shows a car seat which heretofore would be an integral unit to provide seating for one car seat user. It is herein broken down into components in a manner suitable for the description of a modularized car seat, and provides a basis and convenient starting point for a car seat format upon which this invention may be easily implemented and described. It is noted that this is only exemplary and other one person car seats may be likewise be used.

In FIG. 1B, car seat 110 has a car seat back 115 a right hand vertical side 120, a left hand vertical side 125, a right hand horizontal side 115, a left hand horizontal side 130 and a car seat base 135. The vehicle seat 110 has a vehicle seat back 140, a vehicle seat front 145, a right hand seat belt pair 150A, 150B, a center seat belt pair 155A, 155B, and a left seat belt pair 160A, 160B. Each seat belt pair includes a seat belt male connector, and a seat belt female connector that when connected together restrain the person or car seat included between the seat belt pair and the vehicle seat back 140. This car seat 105 is typically restrained by seat belt pair 155a, 155b.

Each of the three seating positions in vehicle seat 110 generally takes up one third of the entire seating width shown as 'W1', 'W2' or 'W3'. Generally, car seat 105 takes up at least one entire seating width, 'W2'. If a second car seat was used it would take up the width 'W1' or 'W3'. A third car seat when used would take up the width 'W3' or 'W1' whichever is not used for the first and second car seats. In some cases a car seat is designed with extra side cushioning and apparatus that takes up more than an adult seat width such that a vehicle having a vehicle seat designed for three adults fails to provide space width for three separate car seats. This invention overcomes this problem and provides more seating for car seat users than provided for adult passengers in a vehicle seat. Although the portions of the car seat in FIG. 1B may be parts of an integral car seat, these portions are henceforth to be considered herein as separate components of a modularized car seat.

In a first aspect of the present invention there is provided a first car seat center 205A shown in FIG. 2, which is a component of a car seat system 200. The car seat system 200 generally employs at least one seat belt of the vehicle. The first car seat system 200 may include a right side car seat end 210, the first car seat center 205A, and a left side car seat end 215. In some embodiments no car seat end or only one car seat end is used. When desired or necessary, this is particularly useful when a car seat center is used between either regular car seats, when the car seat person is not yet ready for a booster seat, when the car seat center is adjacent to a vehicle door or vehicle wall, or when other side support means are available. Some booster seats have upwardly curled sides and/or upwardly curled backs. The backs generally are of minimal height. Some car seat centers have outwardly curled sides to provide support for the car seat person that sits in it.

The right side car seat end 210 includes a car seat support mechanism 220 that is designed to mate with a right side attachment mechanism 225A on first car seat center 205A. The left side car seat end 215 has a left side attachment mechanism 235 that is designed to mate with a left side support mechanism 230A of first car seat 205A. When the car seat system is used as a single car seat, it includes first car seat center 205A, right side car seat end 210 and left side car seat end 215.

Car seat center 205A is generally formed to have a car seat back 206A and a car seat base 207A. In some embodiments car seat back 206A and car seat base 207A are made as an integral unit. Car seat back 206A has indentations 208A and 209A that may be used to accept at least one belt of a vehicle belt pair of the vehicle upon which it is mounted. Car seat center 205A often includes a car seat center belt and/or harness (not shown) to restrain a person seated in car seat center 205A. Car seat base 207A often has two indentations 211A on its right side and two indentations 212A on its left side. Indentation 211A and 212A are made to accept a car seat separator 310 shown in FIG. 3, when a separator is used.

When a car seat separator 310 is used it provides some physical separation between persons sitting in adjacent car seat centers. Car seat separators 211A and/or 212A are used for car seat centers that are adjacent and attached to each other. Indentations 211A need not be used when car seat center 205A is attached or is integral to right side car seat end 210. In a preferred embodiment right side car seat end 210 and first car seat center 205A are formed to be an integral unit.

The car seat system 200 is made to be two person car seat by connecting a second car seat center 205B between first car seat enter 205A and [another car seat not shown or to] left side car seat end 215. As shown in FIG. 2, car seat centers are said to be attached side to side to each other in the position relationship shown for car seat centers 206A and 206B. Sometimes the left side car seat end 215 and car seat 205B are formed to be an integral unit. Left side car seat end 215 includes a left side car seat end 215 attachment mechanism 240 to attach to an adjacent support mechanism.

Second car seat center 205B is generally formed to have a second car seat back 206B and a second car seat base 207B. In some embodiments second car seat back 206B and second car seat base 207B are made as an integral unit. Second car seat back 206B may have indentations 208B and 209B that are used to accept at least one belt of a vehicle belt pair of the vehicle upon which it is mounted.

Second car seat center 205B includes a second car seat attachment mechanism 225B that is designed to mate with support mechanism 230A of first car seat 205A. Second car seat center 205B has a second car seat support mechanism 230B that is designed to mate with another attachment mechanism. Car seat center 206B often includes a car seat center belt and/or harness (not shown) to restrain a person seated in car seat center 205B. Car seat base 207B often has two indentations 211B on its right side and two indentations 212B on its left side. Indentation 211B and 212B are made to accept a car seat separator 310 shown in FIG. 3. Car seat separator 310 is used, when desired, to provide a physical separator between persons setting in adjacent car seat centers. Car seat indentations 211B and/or 212B are used for car seat centers that are adjacent and attached to each other. Indentations 212B need not be used when car seat center 205B is attached or is integral to left side car seat end 215.

In similar fashion the car seat system 200 becomes a three person car seat by connecting another car seat center [not shown] between second car seat center 205B and left side car seat end 215. As stated above, in a preferred embodiment left side car seat end 215 is formed to be an integral unit with second car seat center 205B, and so on. In this case the car seat system 200 is made into a three person car seat by inserting another car seat between the first car seat center 205A and the second seat center 205B, and so on.

Although FIG. 2 shows car seat back 206A to be at a right angle with car seat base 207A, in some embodiments the seat back is formed to be inclined backward. The back is formed to have a curved lower portion meeting with a curved upper portion of the base to which it is attached. In some cases the combination of back and base form an almost flat surface most appropriate for an infant car seat user. This provides a continuous laying portion for the infant.

Generally, the car seat ends and centers are designed to use less vehicle seat 'space width' than the seat width allotted to an adult seat for each car seat user seating. It is preferable that when the car seat system 200 provides seating for two persons its total use of vehicle seat width be not much more than used by a single adult seat. In this way when the two seat car seat system is mounted in a vehicle seat designed for two adult passengers, it leaves room for an adult passenger even after it is mounted in the vehicle seat. Similarly, when the two seat car seat system is used in a vehicle seat designed for three adult passengers, it leaves room for two adult passengers.

As shown in FIG. 2, car seat centers are attached side to side. Each car seat center is herein referred to as having a first side and a second side. For example, car seat center 205A has a first side having indentations 211A and a second side having indentations 212A.

Car seat center 205B has a first side having indentations 211B and a second side having indentations 212B. The first side of car seat center 205A is attached to right side car seat end 210. The second side of car seat center 205A is attached to the first side of car seat center 205B. The second side of car seat center 205B is attached to the first side of another car seat center (not shown), or to left side end 215. End 210 is sometimes referred to as being a first side end. End 215 is sometimes referred to as being a second side end.

Other embodiments have other implementations than the method shown in the present figures for meeting concepts satisfied by the indentations, separator, support and attachment mechanisms according to car system designs. Some of these are not always used. Also, the support and attachment mechanisms need not be the same for all car seat centers and car seat ends. This depends on the car seat system design. These mechanisms need not be on the sides of the car seat centers as shown in FIG. 2. The attachment and support mechanisms need only be compatible with each other and serve the application and specific design actually implemented. Some mechanisms include a spring loaded pin manually or mechanically coupled and decoupled from capturing or non-capturing pin inserts.

Generally, car seats are variously designed wherein the person in the car seat faces either the front or rear of the vehicle car seat. Thus although the above described car seat system shown in FIG. 2, indicated the car seat person is facing the front of the vehicle seat; it is also adaptable to embodiments wherein the car seat person faces the back of the vehicle seat. In also these implementations the support and attachment mechanism operate cooperatively to provide proper attachment of the second car seat to the first car seat, the third car seat to the second car seat, and so on.

Car seat centers are designed to couple car seat centers together using a compatible pair of support mechanism and attachment mechanisms. Attachment mechanisms are designed to mate with a support mechanism. These mechanisms variously employ pins, sliding, connecting, mechanical, magnetic and/or electrical means. Although these mechanism are shown in FIG. 2 to be in both the backs and bases of car seat centers, these or other mechanisms may be used to couple car seats and/or car seat centers together in only the back, the base or any other useful manner. For example, a car seat center for a booster seat would generally only have a base with or without a reduced back. Some, mechanisms are used to accommodate attachment and/or coupling of face to face car seat centers, such that car seat persons in adjacent car seat centers face each other.

In some embodiments of the present invention, the second, third, and/or fourth car seat centers also employ a seat belt of the vehicle. In some cases this may be the same seat belt employed by the first car seat. In some cases this requires use of a seat belt extender to properly restrain the first, second and third car seats. In some cases there is further provided a special seat belt and/or harness for each car seat to restrain the person in that car seat center.

As previously stated, it is known in the art that car seats are designed that have the car seat person in the car seat to face the front of the car vehicle seat, whereas others car seats are designed that have the car seat person in the car seat to face the rear of the car vehicle seat. This variation is particularly useful in the present invention, which provides for seating of car seat persons face-to-face, where at least one card seat person faces the front of the car vehicle seat, whereas at least one others car seat person faces the rear of the vehicle seat.

In a particular aspect of the present invention, the first and second car seat centers are designed such that when attached together by the support and attachment mechanisms the combined attach seats use a vehicle seat width generally allocated to a single vehicle passenger.

Consideration is now directed to design of the car seat base, 207A, and 207B of FIG. 2. This maybe implemented such as to result in better usage of car vehicle seat width. FIG. 4 shows top views of car seat bases for several different cases. FIG. 4A shows a generally rectangular car seat base. This is generally for a car seat system in which all the car seat users face a same frontward or rearward vehicle seat direction, and the same width is provided in the base car seat for the car seat user's head-ward direction 'H', and the leg-ward direction 'L' direction.

FIGS. 4B & 4C show trapezoidal car seat bases in which less car width is provided for the car seat user's legs 'L', than is provided for the car seat user's head direction 'H'. In this way the car seat system may employ less overall vehicle seat width space. It is preferred that car seat bases 4B & 4C be used in combination as shown in FIGS. 4H and 4L. Trapezoidal car seat bases 4B & 4C are also used advantageously for using car seat centers that are adjacent to an adult seat; in so much that the car seat system may provide additional leg or head-ward room for the adult in the adjacent position.

It is advantageous to implement the car seat system in which car seat bases 4B and 4C are used alternately. In some embodiments, a first car seat center uses modified trapezoidal car seat bases 4D or 4F and/or at least one car seat center uses modified trapezoidal car seat base 4E or 4G. Alternating different car seat bases may advantageously be employed with bases being inline with each other as in 4H, or by off-setting the car seat bases as in 4I. Extra wide base 4J is used to provide extra width space for a car seat user needing extra width space, for example as is needed for an obese child or handicapped car seat user. In all these cases, the car seat center is designed to be compatible with the car seat base used. When the car seat base is for a booster seat, the car seat center back is often minimized or not used.

Generally, when a seating position of a car seat system is allocated to a booster seat the car seat center has no car seat back. In some implementations a car seat system combines car seat centers with and without backs. The back of a person using a booster seat would generally be on the vehicle seat back and facing the seat front to allow the booster seat user to dangle his/her legs. A person sitting adjacent to the booster seat person would advantageously be placed on a seat base facing the seat back. Booster seat users may also be placed adjacent to each other using seat bases as appropriate to that seating.

Preferably, each car seat is designed such that the portion of the car seat holding the main body of the person in the seat is wider than the portion of the car seat provided for the legs of the person in the seat. Preferred variations provide that when a first car seat center is a booster seat, the second car seat is an infant seat.

In a further aspect the first car seat has a second support mechanism to accept a second attachment mechanism of a third car seat. When the second attachment is coupled to the second support mechanism the second car seat is on one side of the first car seat and third car seat is on the other side of the first car seat.

It is preferable that the vehicle width taken up by the three seat combination (when both car seat 2 and car seat 3 are attached to car seat) is less than the width of 2 adjacent passenger seats seating persons without a car seat.

It is preferable that both car seat 2 and car seat 3 be designed so that when a person in car seat 1 faces the front of the vehicle, the persons in car seats 2 and 3 face the back of the vehicle, and when the person in car seat 1 faces the back of the vehicle, the persons in car seats 2 and 3 face the front of the vehicle.

In a further aspect this invention includes a multiple person car seat. The multiple person car seat is designed that it provides more seating positions in the vehicle for persons in the multiple person car seat than would be available for persons not in a car seat. A two person car seat is preferably designed to use a vehicle width allocated for a passenger with generally provided for a single passenger. Three and four multiple person car seats are preferable designed to use a vehicle width allocated for two vehicle passengers not seated in a car seat. A four or five multiple person car seat is preferable designed to take up a vehicle width allocated for three passengers not seated in a car seat, and so on. In each design of a multiple person car seat it is advantageous that the car seat provides more seats for car seat users in a seat width, than is provided by the vehicle width space for adult passengers in the vehicle seat in the vehicle.

It is preferable that the multiple person car seat be designed such that the seating position of adjacent seats face opposite ends of the vehicle seat in which it is mounted. For example, a four person seat having seating for a first, second, third and fourth person multiple person car seat would provide seating of the first and third persons to face the front and the second seating of the second and fourth persons facing the rear. In each case it is preferable that each seating position provides more vehicle width for the body of the person using that seating position than it provides for the leg of that person. This would result in more efficient utilization of the vehicle width space, and would enable more passengers in the vehicle than the vehicle width space allows without the multiple person car seat. This is also so for the car seat system described herein.

Each multiple person car seat employs at least a vehicle seat belt to fasten the multiple person car seat to the vehicle. In some cases a seat belt extender is employed together with the vehicle seat belt(s). It is preferable that each seating position have a restraining belt to hold a person in that seating position.

In general, multiple person car seats are designed to provide any combination of car seat centers of the described above for car seat systems.

It is noted that the support and attachment mechanism may be implemented in ways known previously for connecting two parts. This includes but is not limited to pin and insert mechanisms, sliding mechanisms, male to female mating connections, sexless connection mechanisms, etc. In some embodiments, these connections require and/or employ a connection release mechanism to disconnect attached seats or are disconnected manually. These implementations are best chosen to satisfy particular car seat implementation requirements.

In some embodiments adjacent car seats portions are mountable adjustably to use up width not taken by a person in an adjacent car seat portion. Thus, a base of a second car seat uses up a portion of a car seat width available to a first car seat base that is not taken up by a car seat person in the first car seat base of an adjacent car seat. An example of this is shown in FIG. 5.

Figure 5:
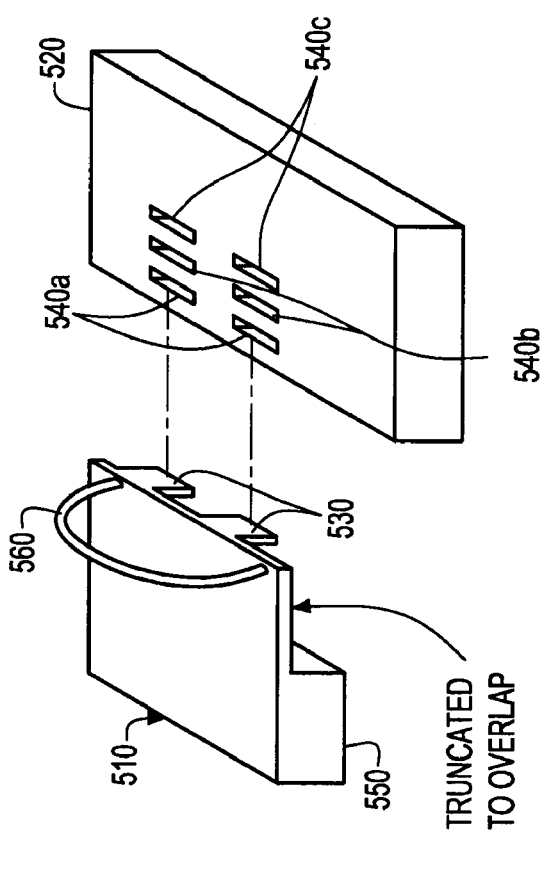
FIG. 5 shows a diagram of an embodiment of adjacent car seats portions are mountable adjustably to enable another car seat user to use up width not taken by a person in an adjacent car seat portion in accordance with the present invention.

FIG. 5 shows a car seat base 520 which has three pairs of receiving holes 540A, 540B and 540C. Each pair of receiving holes is capable of accepting a pair of wing inserts 530 of car seat base 510. Car seat base 510 has a truncated portion 550 which allows attachment of car seat base wing inserts 530 into any pair of receiving holes 540A or 540B or 540C of car seat 520. This provides adjustable mounting of truncated portion 550 upon car seat base 520. Selection among pairs of 540A, 540B or 540C depends on how much car seat width the particular car seat user in car seat 520 takes up. If the car seat user in car seat 520 is an infant, car seat base 510 can be mounted by inserting wing inserts 530 into 540C. In some embodiments, a separator 560 is also provided to separate the persons in car seat 510 from the person in car seat 520, or a person in any adjacent bases when desired.

Figure 6:
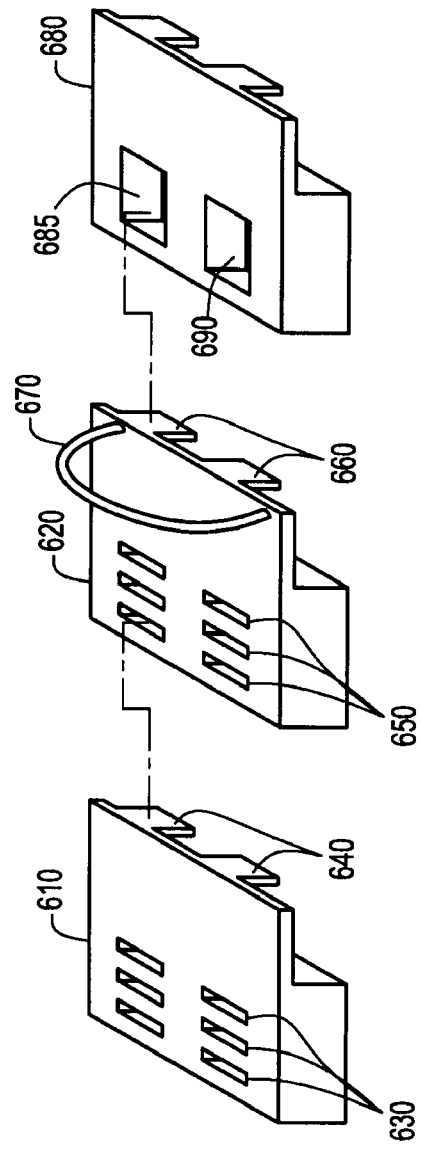
FIG. 6 shows car seat bases which have both receiving holes and wing inserts in accordance with the present invention.

In a still improved embodiment, there is made available car seat bases which have both receiving holes and wing inserts. An example of this is shown in FIG. 6. FIG. 6 shows improved car seat base 610 which has receiving holes 630 and also has wing inserts 640. It also shows car seat base 620 which has receiving holes 650 and wing inserts 660. In this way car seat bases 610 and 620 can be interconnected with each other in arbitrary order and also can accept or be accepted by another car seat base having either or both receiving holes and wing inserts.

In some embodiments a base type as is shown for base 680 is used. Here, the upper group of receiving holes is combined into a large hole 685 and the lower group of receiving holes is combined into a large hole 690 through which the wing inserts slide and are locked into a desired seat width. In some embodiments, a separator 670 is also provided to separate the persons in car seat base 620 from the person in car seat 680 when desired.

In general embodiments, receiving holes may be used to act as a support mechanism and insert wings may be used to act as an attachment mechanism. Actual implementations of wing inserts and/or receiving holes may use any available known interconnecting mechanism, especially those useable for support and attachment mechanisms. Other methods are also available to provide ways of implementing the seat to achieve the objectives using the concepts described herein.

Still better use of vehicle car seat width is achieved in embodiments having two car seats facing each other. In this case two car seats users take up a common portion of vehicle space width that is ordinarily used for a single car seat user. This type of a car seat is herein referred to as a car seat entity for a 'dual person car seat', seating two car seat users face to face. A 'dual person car seat' can be used as a standalone car seat or as a component of a car seat system. It can also be implemented as a component within a multiple person car seat.

Figure 7:
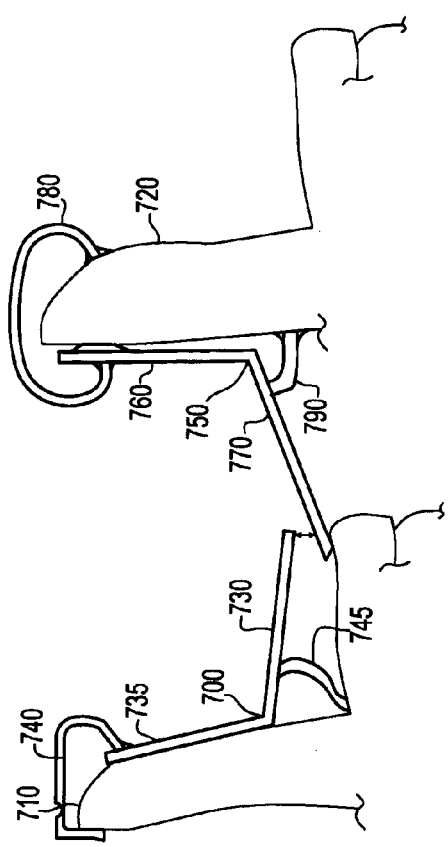
FIG. 7 shows an example embodiment of an open side view of two face to face car seat centers in a 'dual person car seat' in a common vehicle width space, in accordance with the present invention.

Multiple use of face to face car seats as in a 'dual person car seat' provides more room for seating additional car seat users in limited vehicle space width. This is possible since some vehicles are such to allow these extremely advantageous embodiments. In these vehicles there is sufficient room in front of a vehicle seat to allow car seats to be mounted face to face as shown in FIG. 7. FIG. 7 shows an example embodiment of an open side view of two car seat centers 700 and 750. Other embodiments will become apparent that also satisfy the novel inventive concept of a 'dual person car seat'.

Car seat base 730 is a base of a first car seat center 700 that includes car seat back 735. Car seat base 770 is a base of a second car seat center 750 having car seat back 760. The bases 730 and 770 of these centers are mounted face to face between two vehicle seats 710 and 720. In some embodiments the base and back of the car seat centers are integral with each other. Other embodiments are also appropriate using these concepts.

In the example embodiment shown car seat 700 mounted on the front of vehicle seat 710 and is supported using supports 740 and 745. Car seat 750 is mounted at the back of vehicle seat 720 and is supported using supports 780 and 790. In the embodiment of FIG. 7, more leg room is available to a car seat user in seat 750 than is available to a user in car seat 700, thus an infant may be placed in car seat 700 and an older child in seat 750.

Figure 8:
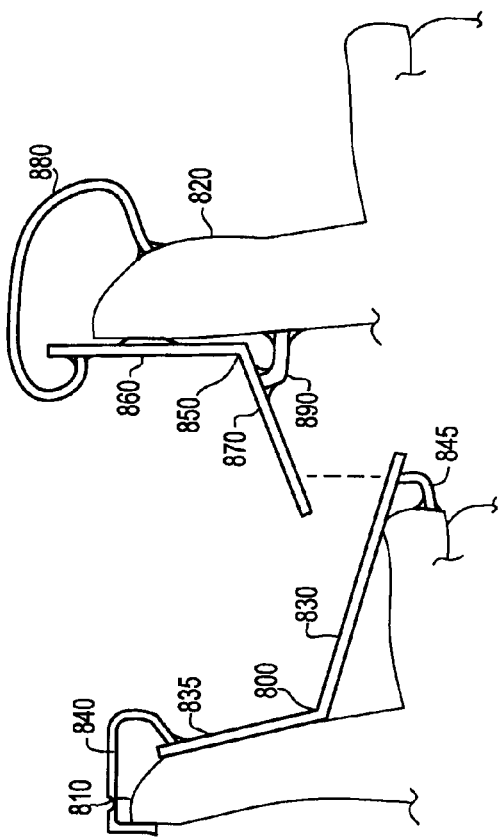
FIG. 8 shows an alternate embodiment of car seats mounted face to face car seat centers in a 'dual person car seat' in a common vehicle width space, in accordance with the present invention.

FIG. 8 shows an alternate embodiment of car seats mounted face to face. In this example embodiment car seat 800 is mounted on the front of vehicle seat 810 and is supported by supports 840 and 845. Car seat 850 is mounted on the rear of vehicle seat 820. Car seat 800 includes car seat back 835 and car seat base 830. Car seat 850 is supported by supports 880 and 890. Car seat 800 includes car seat back 835 and car seat base 830. Car seat 850 includes car seat back 860 and car seat base 870. In this embodiment more leg room is provided for a car user in car seat 800 than is provided to a user in car seat 850. Thus, for example, car seat 850 is best used for an infant and car seat 800 may be used by an older child. This is most advantageous when car base 830 is a booster seat allowing the child in car seat 800 to dangle his/her legs down vehicle seat 810.

In some embodiments of face to face or, the face to face car seats are mechanically connected to each other and need not make use of vehicle seat mounting. For example, these types of car seats often only need to make use of the vehicle provided adult seat belts with or without a seat belt extender. In these as with other embodiments in this application, the car seat back and the car seat base may be an integral unit. Also, these car seats may generally have at least one car seat end. In some cases the dual person car seats are formed integral with at least one end.

It was shown that it is most advantageous to design multiple person car seats to provide more room for car seat users than is available in a same width space. However, some embodiments of multiple person car seats actually provide seating space for a car seat user that essentially uses the same width space as used for regular adult passengers. These may be implemented in any of the ways described above. This is advantageous in so much that it provides features of previously known car seats with increased room for car seat persons in the multiple person car seat or car seat system. It reduces the requirements of having both left and right car seat sides for each car seat person. Car seat sides are sometimes referred to as car seat walls. Car seat sides may not always be required between car seat persons. A separator is sometimes useful between car seat persons. The separator need not be as wide as the two adjacent car seat sides it is replacing when two separate adjacent car seats are used.

For example, in some embodiments a multiple person car seat for two car seat users advantageously uses the entire width space allotted for adjacent regular passengers of a vehicle. When two separate car seats are used as heretofore required for two car seat users, each separate car seat has its own right and left side sides [walls]. There are two car seat sides [walls] adjacent to each other. A multiple car seat for the two car seat users eliminates the need for the adjacent side walls between the two car seat users. In this case the two car seat users will each have more space and comfort for a multiple person car seat or car seat system designed for two than in prior art separate car seats. If necessary or desired the two car seat users in the multiple person car seat or car seat system designed for two may include a separator between the two car seat persons. A same advantage is achieved in a multiple person car seat or car seat system designed for three etc.

In still other embodiments a multiple person car seat or car seat system designed for two or more car seat persons is embodied to provide at least one very wide car seat base for meeting special requirements of a special car seat user. Some embodiments use a combination of car seat bases that are each wider, equal to or narrower than the car space width provided for a regular passenger in a regular vehicle seat. This depends on each particular need and application.

In another aspect, the present invention includes a car seat system comprising a first car seat formed to seat a first car seat person in a vehicle seat, the vehicle seat made to provide at least one sitting position for a passenger in the vehicle. Generally, the car seat system is mounted in the vehicle seat employing a built-in seat belt of the vehicle, or uses another mounting. The first car seat has a set of first car seat components including: a first car seat center with a first car seat back, and a first car seat base that is able to be attached to the first car seat back.

In some embodiments, the first car seat provides seating for the first car seat person when the first car seat is mounted as a standalone car seat; between and in-line with or facing two regular vehicle seats; adjacent to at least one other car seat wall; or adjacent to an end of a vehicle seat. In some cases, two or more car seat centers are combined and mounted in one of these ways. In some cases car seats are combined in a way that car seat persons face one another.

As with previously described embodiments, the first car seat base can be a rectangular car seat base, a trapezoidal base, a modified trapezoidal base, an extra wide base, a base having base overlap capability, a base pair formed for a dual person car seat, a base having base overlap capability to overlap another base; or a booster seat base. In practice, any car seat base discussed herein can be one of these bases.

In some cases the car seat system includes a first side end attachable to a first side of the first car seat center, a first car seat support mechanism mounted on a second side of the first car seat center. Sometimes it includes a second car seat formed to seat a second car seat person in the vehicle seat; the second car seat includes a second car seat center attachable to the second side of the first car seat center along a first side of the second car seat center. The second car seat center includes a second car seat back, a second car seat base attachable to the second car seat back, and a second car seat attachment mechanism to couple with the first car seat support mechanism.

Sometimes it includes a second car seat end attachable to the second car seat center along a second side of the second car seat. Sometimes the second car seat is attached to the first car seat, and the second car seat attachment mechanism is coupled with the first car seat support mechanism to provide car seat seating for two car seat persons. Sometimes it includes at least one additional car seat which has an additional car seat center, each additional car seat center having, an additional car seat back, an additional car seat base attachable to the additional car seat back, an additional car seat attachment mechanism along a first side of the additional car seat center to couple with an adjacent car seat support mechanism on a second side of an adjacent car seat; an additional car seat support mechanism along a second side of the additional car seat center to couple with an adjacent car seat attachment mechanism on a first side of another adjacent car seat. Sometimes at least one set of car seat components is formed as a booster seat having a minimal car seat back or as an integral unit.

Sometimes it includes a second side end attachable to a second side of the first car seat center, and/or least one car seat center back faces at least one other car seat back such that a car seat person seated in one car seat center faces another car seat person seated in another car seat center, and/or at least one car seat base is capable of overlapping another car seat base such that the car seat system uses up a lesser amount of vehicle space width, and/or at least one car seat is a dual car seat providing seating for two car seat persons facing each other within essentially car width space used for a single car seat person, and/or it has at least one seat belt extender to extend the at least one seat belt for use with the car seat system.

Sometimes it includes at least one seat belt extender to extend the at least one seat belt for use with the car seat system, and/or the vehicle is taken from a group of vehicles including: an automobile, a bus, an airplane or a water vehicle.

In some embodiments a car seat system includes a first car seat formed to seat a first person in a vehicle seat made to provide a passenger sitting position within a vehicle, the first car seat employing a first vehicle seat belt for restraining the first car seat in the vehicle, and a first car seat support mechanism, the first car seat support mechanism formed to accept a second car seat attachment mechanism of a second car seat to attach the second car seat to the first car seat. Sometimes the first car seat support mechanism is integral to the first car seat.

Sometimes the car seat system includes a second car seat having the second car seat attachment mechanism. Sometimes the car seat attachment mechanism is integral to the second car seat.

In some cases the car seat system includes a second car seat support mechanism to accept a second car seat attachment mechanism of a third car seat to attach the third car seat to the first car seat. Sometimes the first car seat support mechanism is formed on one side of the first car seat and the second car seat support mechanism is formed on an opposite side of the first car seat, and/or the second car seat has a second car seat support mechanism formed to accept a second car seat attachment mechanism of a third car seat.

Sometimes the first car seat includes a first car seat attachment mechanism to attach the first car seat to a particular support mechanism of another car seat, and/or a plurality of the first car seats, wherein attachment mechanism in each seat of the plurality of first car seats is attachable to any support mechanism of another car seat and/or support mechanism in each seat of the plurality of seats accepts attachment mechanism of another car seat.

In some car seat system embodiments the vehicle has contiguous passenger space width allowed for two persons when the two persons are sitting in the vehicle without any car seat, and the car seat system is formed for seating three persons in the vehicle within the space width allowed for two persons and/or the vehicle has contiguous passenger space width allowed for three persons when the three persons are sitting in the vehicle without any car seat, and the car seat system is formed for seating at least four persons in the vehicle within the space width allowed for three persons.

Sometimes the car seat system provides seating for one or more persons, and at least one sitting positions in the car seat system seats an infant and at least one other sitting position seats an older child. A car seat system s one of: a combination of infant seats, a combination of booster seats and any combination of infant seats and booster seats. An infant is less than two years old an older child is less than 12 years old.

Sometimes any person sitting in one sitting position of the car seat system faces a back of the vehicle and an adjacent person sitting in an adjacent sitting position faces a front of the vehicle.

Sometimes the support mechanism is integral with an attachment mechanism forming a combined mechanism, and the combined mechanism is used to provide one of support for another car seat attachment mechanism or attachment to another car seat.

Sometimes the seat system includes a plurality of car seat bases and at least one car seat base is capable of overlapping a portion of an adjacent car seat base width not used by a person in the adjacent car seat base. In some cases the adjacent seat includes receiving holes capable of accepting wing inserts on the at least one car seat base to provide adjustable mounting of a truncated portion of the at least one car seat to overlap the portion of the adjacent car seat. In some cases it includes at least one separator to separate persons in adjacent car seats.

Furthermore, this invention includes a multiple person car seat that includes: a plurality of car seat person sitting positions to provide seating in a vehicle for a plurality of car seat persons, the multiple person car seat employing at least one seat belt of the vehicle for restraining the multiple person car seat in the vehicle.

In some embodiments of the multiple person car seat the vehicle has contiguous passenger space width allowed for two passengers when the two passengers are sitting in the vehicle without any car seat, and the multiple person car seat is formed for seating three car seat persons in the vehicle within the space width allowed for two regular passengers, and the vehicle has contiguous passenger space width allowed for three regular passengers when the three passengers are sitting in the vehicle without any car seat, and the multiple person car seat formed for seating at least four persons in the vehicle within the space width allowed for three regular passengers.

In some cases the multiple person car seat includes at least one seat belt extender to extend the at least one seat belt for use with the multiple person car seat, and/or at least one sitting position seats an infant and at least one other sitting position seats an older child. In some cases the infant is less than two years old and the older child is less than 12 years old.

In some cases of the multiple person car seat any sitting position that seats an infant provides amenities associated with a vehicle infant seat, and any sitting position that seats the older child provides amenities associated with a vehicle booster seat, and/or any person sitting in one sitting position of the multiple person car seat faces a back of the vehicle and an adjacent person sitting in an adjacent sitting position faces a front of the vehicle. Sometimes one person is an infant and an adjacent person is an older child.

Sometimes the multiple person car seat comprises one of: a combination of infant seats, a combination of booster seats and any combination of infant seats and booster seats.

Sometimes the sitting positions are designed so that one leg of the any person sitting in the one sitting position is capable to be placed between legs placed by the adjacent person, and such that one leg of the adjacent person sitting in the adjacent sitting position is capable to be placed between legs placed by the any person, and/or the sitting positions are designed so that one leg of the any person sitting in the one sitting position is capable to be placed between legs placed by the adjacent person, and such that one leg of the adjacent person sitting in the adjacent sitting position is capable to be placed between legs placed by the any person, and/or the sitting positions are designed so that a pair of legs of the any person sitting in the one sitting position is capable to be placed between another pair of legs placed by the adjacent person.

In some multiple person car seats the sitting positions are designed so that a pair of legs of the any person sitting in the one sitting position is capable to be placed between another pair of legs placed by the adjacent person.

In some car seat systems and/or multiple person car seats, any person sitting in one sitting position of the car seat system faces a back of the vehicle seat and an adjacent person sitting in an adjacent sitting position faces a front of the vehicle seat so that the car seat persons face each other.

In some cases the sitting positions are designed so that a pair of legs of the any person sitting in the one sitting position is capable to be placed between another pair of legs placed by the adjacent person, wherein one person is an infant and the adjacent person is an older child, and/or wherein the infant is less than two years old and the older child is less than 12 years old.

In some embodiments of the multiple person car seat' the vehicle has contiguous passenger space width allowed for two persons when the two persons are sitting in the vehicle without any car seat, and the car seat system is formed for seating two persons in the vehicle generally within space width allowed for one person such that a second passenger is still capable of sitting adjacent to the car seat.

This invention also provides a car seat system that includes: a plurality of car seat centers; a right side car seat end including a car seat support mechanism that is designed to mate with a right side attachment mechanism of a first car seat center from the plurality of car seat centers; a left side car seat end having a left side attachment mechanism designed to mate with a support mechanism of another car seat center from the plurality of car seat centers; wherein each car seat center has an attachment mechanism to attach a support mechanism on the each car seat center on a right side, and a support mechanism to attach an attachment mechanism on the each car seat center on a right side, and wherein each car seat center is attached to another car seat center on a least one side of the each car seat center. Each car seat center comprises at least one of: a car seat base and a car seat back; a dual person car seat, an overlapping car seat; a booster seat, an integral unit of a car seat base and a car seat back; and any combination of these centers.

This invention also provides a car seat entity including a dual person car seat. The dual person car seat includes first car seat for seating a first car seat person and being mountable on a first vehicle seat to take up a first car seat width of a vehicle width in the vehicle seat; a second car seat for seating a second car seat person and being mountable facing the first car seat and being included substantially within and taking up little or no more vehicle width than the first car seat width.

In some cases the second car seat is mounted on a back side of a second vehicle seat being in front of the first vehicle seat, and/or the first and second car seats are components of a car seat system or a multiple person car seat. The bases may be any of the bases described above. and/or is a shape wherein less car width is provided for the car seat user's legs, than is provided for the car seat user's head-ward direction, so that the total car seat system employs less vehicle seat width.

Figure 9:
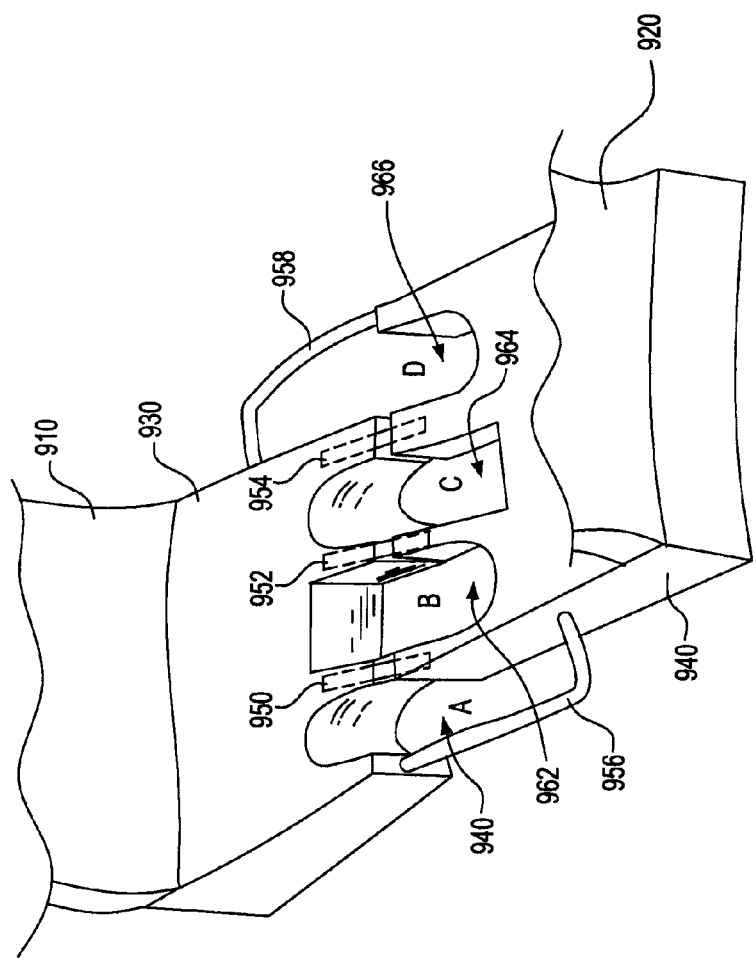
FIG. 9 shows an example embodiment of a car seat adapted to provide two car seat sitting positions 910 and 920 for two adjacent car seat persons sitting facing each other having bases that overlap each other in vehicle space width in accordance with the present invention.

Thus, FIG. 9 shows an example of leg placement when two car seat persons are in adjacent base positions facing each other. As shown, the car seat bases 910 and 940 are mounted to overlap each other in vehicle space width. Car seat base 930 is attached to car seat base 940 with attachment mechanism 950, 952 and 954. In some cases the attachment mechanism includes 956 and 958. When seated, the left leg of each car seat person is placed between the legs of the facing car seat person. This makes advantageous and efficient use of the vehicle's car seat width.

Figure 10:
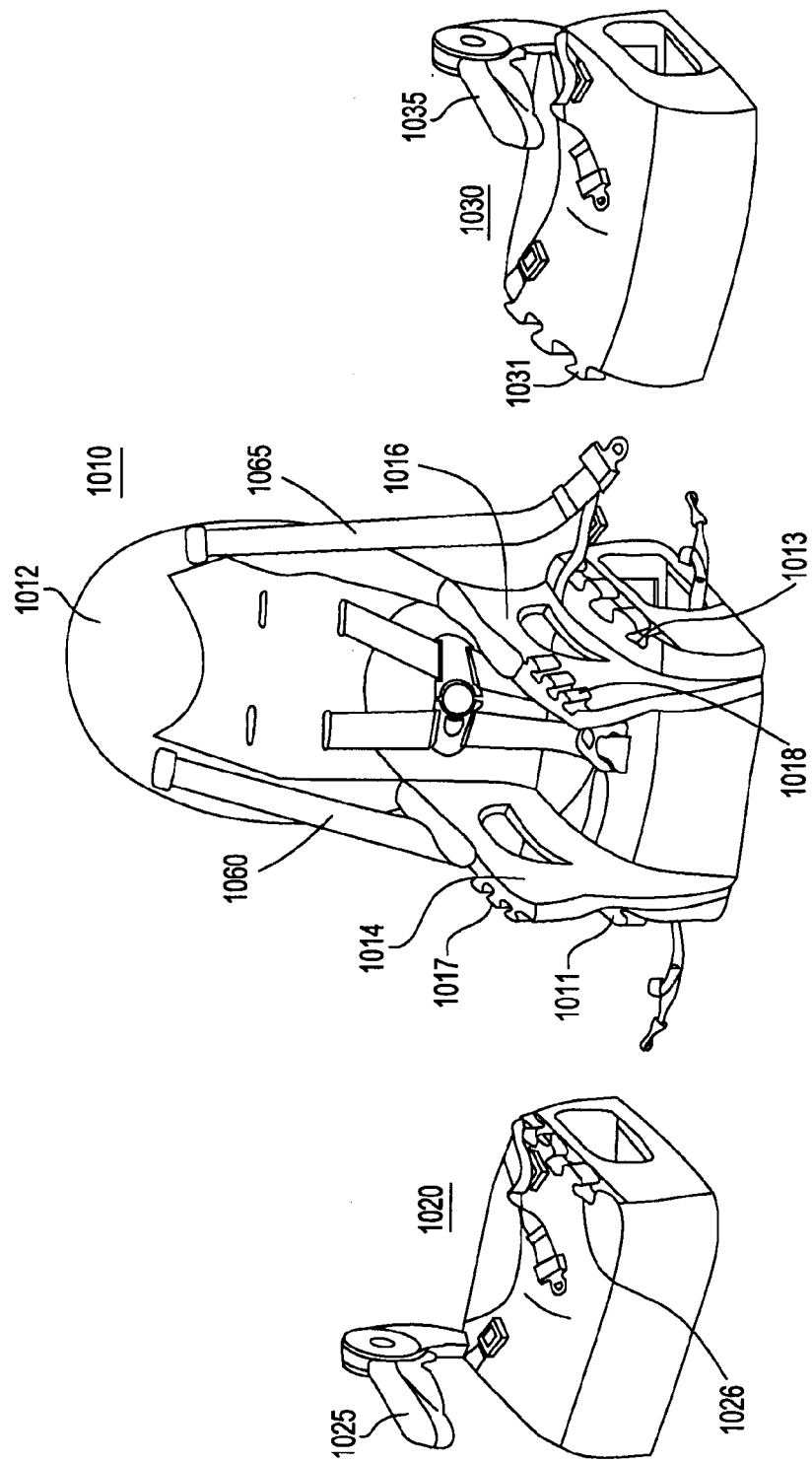
FIGS. 10A, 10B and 10C show an example of removably attachable car seats in a car seat system for 3 car seat persons in accordance with the present invention.

FIGS. 10A, 10B and 10C show an example of car seats 1010, 1020, 1030 that are removably attachable to each other for use in a car seat system for three car seat persons. FIG. 10A shows a car seat 1010 for a front facing infant. FIG. 10B shows a booster car seat 1020 attachable to the right side of car seat 1010. FIG. 10C shows a booster car seat 1030 attachable to the left side of car seat 1010. Booster seat 1020 shows an example of a right side end 1025. Booster seat 1030 shows an example of a left side end 1035.

Figure 11:
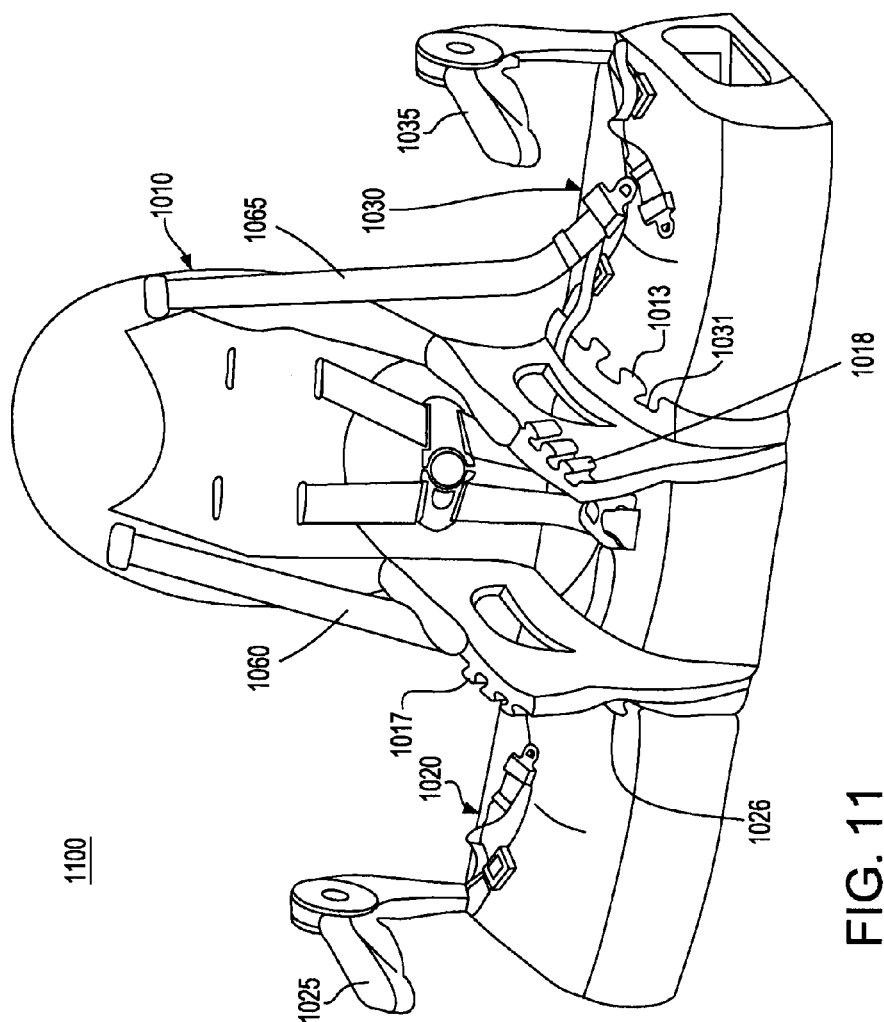
FIG. 11 shows an example combination of a car seat having three seating positions in accordance with the present invention.
Figure 12:
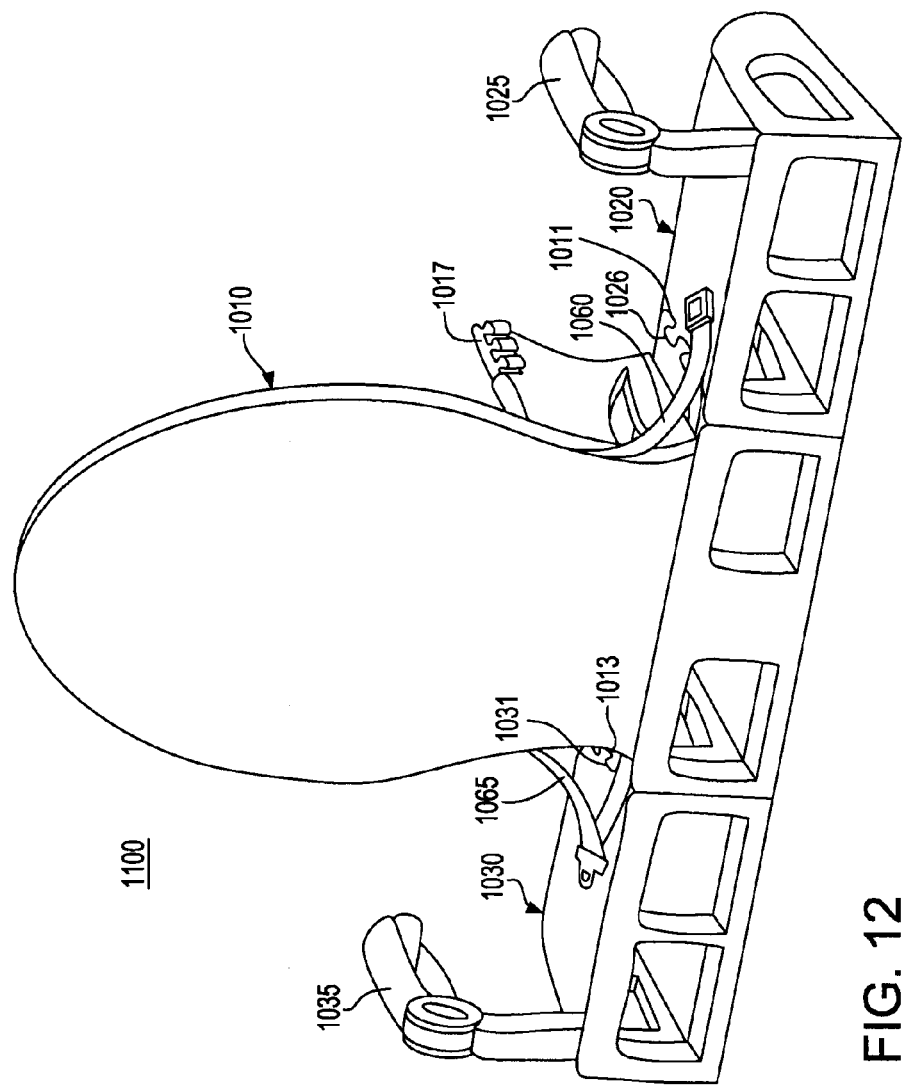
FIG. 12 shows an example of a rear view of the car seat shown in FIG. 11 in accordance with the present invention.

Any of the many ways known to those in the art can be used to attach a seat to another. A novel attachment mechanism is shown in FIGS. 10A, 10B and 10C to attach individual car seats to one another. Seat 1010 in FIG. 10A has male inter-digitated fingers 1011 to attach to female inter-digitated fingers 1026 on seat 1020. The attachment of seat 1020 to seat 1010 is shown in FIGS. 11 and 12. Fingers 1011 of seat 1010 are lowered between fingers 1026 of seat 1020. Seat 1010 in FIG. 10A also has female inter-digitated fingers 1013 to attach to male inter-digitated fingers 1031 of seat 1030.

Fingers 1031 of seat 1030 are lowered to mate with fingers 1013 of seat 1010. Mating the male fingers of one seat with the female fingers of the adjacent seat causes seat-to-seat capture to secure one seat to another. The seats can be separated by lifting the fingers of one seat above the fingers of the seat to which it is attached.

It is noted that a two seat system may be formed to attach seat 1020 to seat 1030 by inserting male fingers 1031 between female fingers 1026. Although not shown a booster seat may also be formed to have male fingers on one of its sides and female fingers on its other side.

Although infant seat 1010 is shown for a frontward facing car seat user, it can similarly be implemented for a rearward facing car seat user. The number of car seat positions may be increased by adding one or more car seats having both male and female fingers as shown for car seat 1010. In some embodiments a plurality of car seats of a car seat system have both male and female fingers as does seat 1010, to allow attachment of another car seat to either or both of that car seat's sides.

It is noted that generally each booster seat has a receiving mechanism for receiving a lap/shoulder belt system. This sometimes uses the belt of the vehicle with an extension as required by the seat design.

Further car seat embodiments are provided that enable the insertion of one car seat type insert into another car seat type. This allows changing a booster seat to an infant seat by inserting an infant seat insert into the booster seat. It also allows changing a forward facing car seat to a rearward facing car seat as for example to satisfy particular car seat type combinations for different age children as desired and/or required by a particular use situation according to desire of for example a parent or a vehicle driver. Referring to FIG. 10A seat 1010 of FIG. 10A is shown having an example embodiment which allows forward facing seat 1010 to accept a rearward facing seat inserted into seat 1010. The rearward facing seat is not shown for simplicity. This can be accomplished by providing the rearward facing car seat with both male and female fingers that are formed to attach with female and male fingers of seat 1010 respectively. Thus the male fingers (not shown) of the rearward facing seat fit between female fingers 1018 of seat 1010 and the female fingers (not shown) of the rearward facing seat fit between male fingers 1017 of seat 1010.

FIG. 11 shows car seat system 1100 for three car seat positions with efficient usage of car vehicle seat space width. It is only an example combination having three seating positions. Other three seat configurations are also included in the concepts of this invention. A booster seat may be located centrally. Two or three booster seats may be attached. Two or three infant seats may be attached. This car seat system 1100 may be viewed as three seats of a car seat system having seats that are removable attached, or these may be considered to show a multiple car seat for three car seat persons. Belts 1060 and 1065 are an example of a car vehicle belt extender attached to and extending original vehicle seat belts to provide restraint for the car seat system and or the multiple car seat.

FIG. 12 shows an example of a rear view of the car seats shown in FIG. 11. It particularly points out an example of the use of car seat extenders 1060 and 1065 which are attachable to the original vehicle seat belts to restrain seats in a car seat system, or to restrain a multiple car seat.

As in FIG. 11, FIG. 12 shows rear view of the example three seat combination of two booster car seats separated by an infant seat. This should also be viewed as a combination of three individual car seats that are interconnected to form a three seat car seat system or as a three seat multiple car seat.

Thus, although FIGS. 11 and 12 show a centrally located infant seat, it is noted that a three seat combination may be formed of any combination of infant seats and booster seats, wherein any of the three seating positions may be a booster seat, a frontward facing or a rearward facing infant seat.

Also as with FIG. 11, FIG. 12 may also be viewed as a rearview embodiment of an integral multiple car seat for three car seat users. The integral car seats may similarly be embodied to have two car seat positions in which either or both positions may be a booster seat, a forward facing infant seat and/or a rearward facing infant seat.

It is noted that in some embodiments there is a combination of only two individual seats. This may be two individual booster seats, two individual infant seats or one infant seat and one booster seat. Although the infant seat shown is forward facing in these example embodiments, any or all of the infant seats may be rearward facing. As described, the head of a car seat user in a forward facing car seat is close to or leaning against the vehicle seat back of the vehicle seat in which the car seat is mounted, and the legs of the car seat users are directed towards the front of that vehicle seat. The head and legs of the car seat user in a rearward facing car seat are reversed.

As previously described, it is often advantageous to enable, for example, a parent of users of a car seat to change the types and/or configuration of one or more the seats provided in a car seat system. This is embodied by allowing insertion of a car seat insert to change the type of car seat in a particular car seat user position.

The ability to change from and to one car seat type to another car seat type is advantageous even for a single car seat. In this embodiment this is accomplished by addition or removal of an insert to the car seat. Thus a booster car seat can be charged to either a forward facing or a rearward facing car seat. A forward facing car seat can be changed to a rearward facing car seat.

FIGS. 13A, B, C and D show a still further embodiment of providing one or more car seats with the ability to accept a car seat insert. The car seat insert is such as to change the type and use of the car seat into which it is inserted to provide a different car seat user seating capability. For example, a typical car seat insert 1310 is shown in FIG. 10A. In this example car seat insert 1310 is shown as a rearward facing insert. It may be inserted into car seat 1330 of FIG. 13C to change car seat 1330 providing car seating for a forward facing car seat user. Car seat 1330 is referred to as a receiving car seat. The handle 1312 of car seat insert 1310 is such has to have one insert mechanism 1314 at one of its ends and another insert mechanism 1316 on its other end. The insert mechanism 1314 and 1316 of car seat 1310 are inserted into insert receivers 1332 and 1334 of car seat 1330 respectively.

In order to form a two position car seat system booster seat 1340 is attached to car seat 1330 by interconnecting male fingers 1344 of car seat 1340 with female fingers 1336 of car seat 1330. This provides a two seat car seat system for one infant seat user and one booster seat user. When booster seat 1340 is attached to car seat 1330, the booster seat can be changed to provide seating for second infant seat user by inserting car seat insert 1310 over booster seat 1340. This is accomplished by inserting insert mechanisms 1314 and 1316 of car seat 1310 into receiving mechanism 1346 of booster seat 1340 respectively.

In similar fashion, booster seat 1320 can be attached to infant seat 1330 by inserting male fingers 1338 of seat 1330 into female fingers 1326 of booster seat 1320. When booster seat 1340 is also attached to infant seat 1330, this forms a car seat system with three seating positions. In like manner, booster seat can be changed to provide seating for an infant by inserting a car seat insert such as 1310 into booster seat 1320 by inserting infant seat 1310 insert mechanisms 1314 and 1316 of infant seat 1310 into receiving mechanism 1322 of booster seat 1320 and into receiving mechanism 1332 of infant seat 1330. In like manner, positions may be made for 4, 5, 6, etc car seat users. This is particularly useful in a large van, bus or water vehicle.

This novel concept is also useful to change all seats of the three seat car system formed by seats 1320, 1330 and 1340 to provide seating for three infants by using two car seat inserts such as car seat insert 1310. It is noted that although seat insert 1310 is shown as a rearward facing insert, this concept is similarly applicable to a forward facing insert. Thus this concept is useful to reversibly change a single car seat or any number of car seats of a car seat system to-and-from a booster seat to a forward or rearward facing infant seat and/or a forward facing changing seat to a rearward facing infant seat. Use of the insert mechanisms described is just another example of a novel method to connect a car seat insert into a car seat.

Figure 13E:
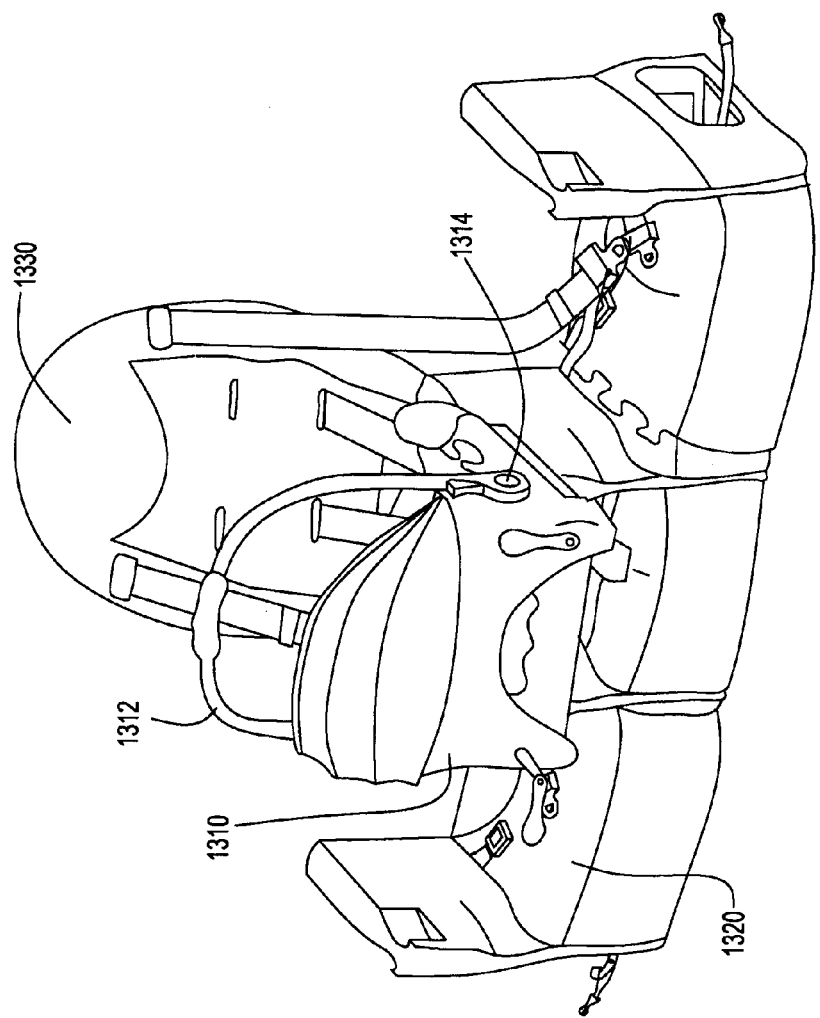

FIG. 13E shows an example of a three car seat system including booster seats 1320 and 1340, and infant seat 1330 with car seat insert 1310 inserted within car seat 1330. It is noted that FIG. 3E may also be viewed as an integrally constructed three position multiple car seat having positions 1320, 1330 and 1340. As shown, multiple car seat 1300 has a car seat insert 1310 inserted into its central seat 1330. The central seat 1330 formed for a forward facing infant seat user and is changed to provide seating for a rearward facing infant seat user, Although FIG. 13E shows a particular car seat combination, other car seat combinations are similarly formed using the concepts of this invention. For example, the central car seat of FIG. 13 can be a booster seat and/or any of the outside car seat positions may be an infant seat. Each of the seats may be formed to include any of the car seat bases discussed above, each with particular advantages.

Thus in accordance with the present invention there is provided an insertable car seat module which includes a receiving car seat of a first type having receiving mechanism to receive a car seat insert. The car seat insert has inserting mechanism to couple with the receiving mechanism and changing the first type car seat to a second type car seat.

It is noted that for a typical three position car seat system or multiple car seat as shown in FIG. 13E, the seats are designed such that even in an embodiment when each of the three car seat positions provides about twelve inches of car seat width to each car seat user. The total vehicle space width taken up by the three positions is between 36 and 38 inches, Considering the case when a three passenger rear vehicle seat is 54-56 inches wide, use of the three position car seat adequately leaves 16-20 inches of vehicle width space for an adjacent non car seat using vehicle passenger.

It is further noted that other methods of inserting a car seat insert into a car seat may be used employing the concepts of this invention. Some embodiments enable insertion of a plurality of car seat inserts into a car seat system and/or a multiple car seat. Generally, car seat inserts are removable to enable continued usage of the car seat into which it is inserted to revert back to its original form and use. In some cases insertion of the car seat insert is purposely made to be permanent according to a particular application where it is used.

It is still further noted that the concept of inserting a car seat into another car seat is also advantageously used with any singular car seat. Almost any existing or to be manufactured car seat can be used to be a receiving car seat. Generally, this is accomplished by providing either a specific or universal insert receiver for that receiving car seat. This allows the capability to advantageously change any car seat to provide a desired use of that car seat which is only available by providing that car seat with a car seat insert. In some embodiments an insertable car seat is designed to have universal insert mechanism allowing it to be inserted into almost any singular car seat. In some embodiments a insert receiving car seat is designed to have universal receiving mechanism allowing it to receive almost any insertable car seat.

Thus, it is further noted that an insertable car seat can be used with any single or multiple car seat of any manufacturer, make or model. Just as the concept of an insertable car seat can be used to change a forward facing car seat to a backward facing car seat it can be used to change a backward facing car seat to a forward facing car seat. This uses an interconnecting mechanism formed for the car seat that is receiving the insertable car seat being compatible with the mechanism of the insertable car seat.

A still further advantageous concept of this invention is the provision of a car seat having variable width. In this way, a particular car seat user has the ability to use only the amount of vehicle seat width space necessary for that particular car seat user. The available width adjustment is advantageously made to range from less than a standard infant or child width requirement to more than the standard width requirement. Typically this may range of width adjustment from 9 to 16 inches. More or less width adjustment is useful for some applications, especially for car seat users that are very small, very broad and/or handicapped.

Figure 14A:
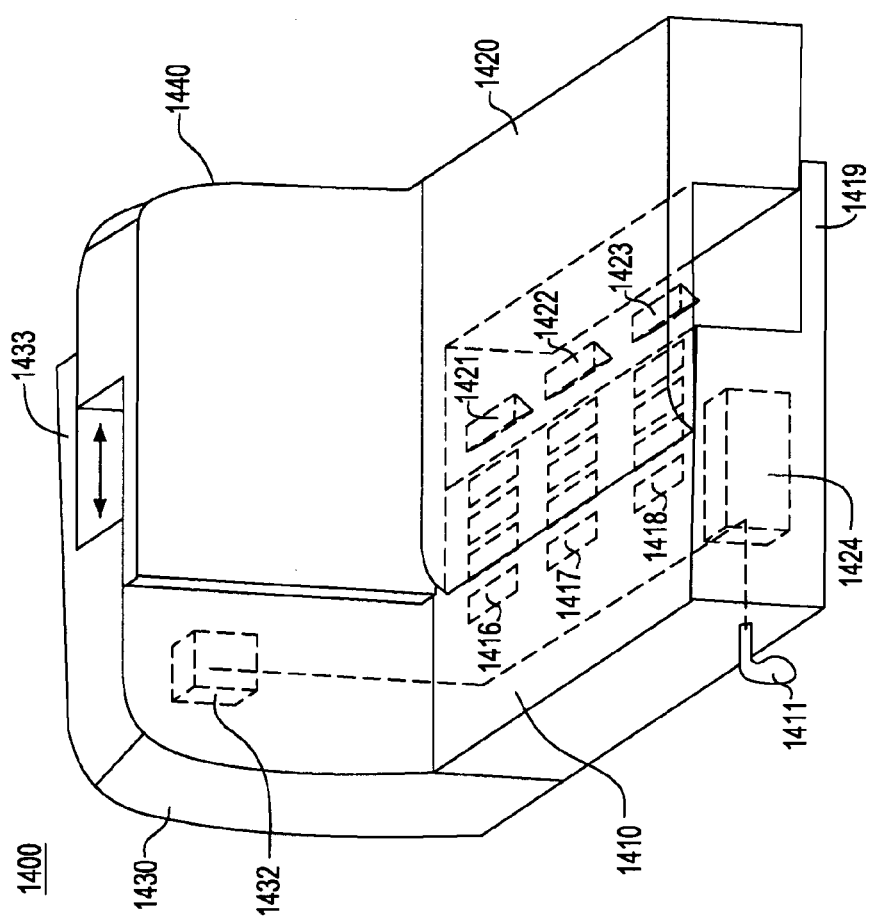
FIGS. 14A-B show an example embodiment for a variable width car seat center in accordance with the present invention.

FIG. 14A shows an example embodiment for a variable width car seat center 1400. It includes a left side base portion 1410 and a right side base portion 1420. A left side base portion 1420 has three rows of holes 1416, 1417 and 1418. Each hole in each of the rows has room to accept of three triangular protrusions. 1421, 1422 and 1423 in right side base portion 1420. The triangular protrusions are advantageously spring loaded to be inserted into any of the holes it comes to. Movement of right side base portion over the extending portion 1419 of left side base portion 1410 is sometimes controlled by a gear-like mechanism 1424 capable of being controlled by are 1411. For simplicity other peripheral equipment such as seat belts is not shown.

In one case, the two base portions brought together should be viewed as a variable width booster seat. Addition of left and right of seat back portions 1430 and 1440 make the seats useful for infants. Control mechanism 1424 also controls. A base cover mat, not shown, makes the seat comfortable.

Figure 14B:
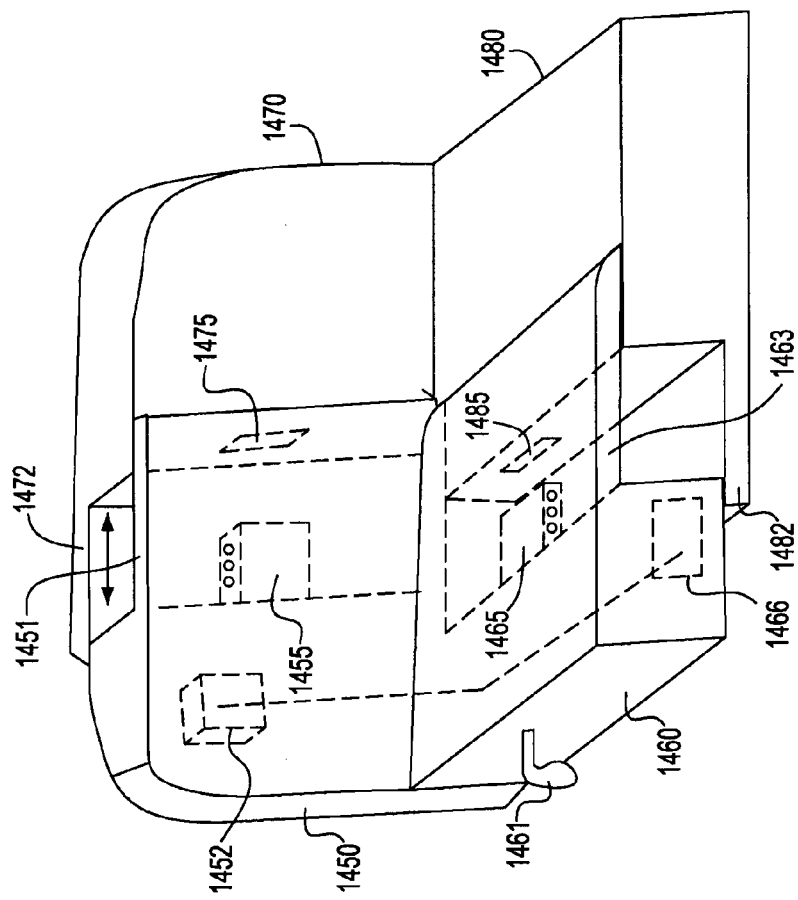

An alternate embodiment of a variable width base seat is shown in FIG. 14B. In this example left side base portion 1460 has extension 1463 and right side base portion 1480 has extension 1482. Left side base portion has protrusion 1465 slideably fitting into slot 1485 of right side base portion 1480. Movement of the left side base portion 1460 over the right side base portion to change the total seat width is sometimes accomplished by a gearing system 1466 driven by control 1461 or done manually. A base covering mat not shown is sometimes used to make sitting on the positioned base portions more comfortable.

Use of variable width base portions 1460 and 1480 are also useful for a singular booster seat. In order to form a variable width infant seat left and right back portions 1450 and 1470 are used. Left back portion 1450 includes extension 1451 and protrusion 1455. Right side back portion 1470 includes extension 1472 and slot 1475. Slot 1475 receives protrusion 1472 movement of 1450 over 1470 either manually or as controlled by gear box 1452. When used year box 1452 is also driven by control 1461.

An alternate embodiment of variable car seat width provides provision to slide one car back and/or base portion to be set by sliding one portion over the other car portion. This may be manually controlled in about one half inch increments. In one embodiment the two base portions are connected together by an accordion type section, with the accordion being let out or pulled in to widen or narrow the car seat width.

Some embodiments of a multiple car seat employ the technique shown in FIG. 14A and/or FIG. 14B to provide seating for two or more car seat users. In these embodiments, for example in FIG. 14A, the vehicle width provided by moving right side base portion 1420 from left side base portion 1410 is sufficient to provide seating for two or more car seat users. One or more separators are sometime employed to provide a wall-like separation between the two or more car seat users. An example separator is shown in FIG. 3. The separator sometimes makes use of at least one of the triangular protrusions 1421, 1422 and 1423 and one or more rows of holes 1416, 1417 and 1418.

It is further noted that variable width single or multiple car seat using the concept of FIG. 14A and/or FIG. 14B may be formed to allow insertion of a forward or rearward facing insertable car seat. In some embodiments the insertable car seat is placed in the center and makes use of mechanism for varying the car seat width. Generally, the insertable car seat may be either forward or rearward facing as described by car seat user.

It is noted that a car seat system can be a combination of one or more regular width, car seat bases combined with one or more variable width car seat bases, all regular bases or all variable width bases as required and/or desired in a particular application. A multiple integral car seat can also provide variable width for any or all of its car seat positions. This would allow car seat position width to be shared and set according to the width of the actual car seat users in a particular usage situation.

It is noted that this variable base width concept is described considering only the car seat base and/or center portion of a car seat. This may be as shown for example for car seat centers 205A or 205B of FIG. 2. All the other car seat considerations of the car seats and/or car seat components shown in FIGS. 2 through 9 are similarly relevant and useful to car seat bases having variable width and when forming a multiple person car seat or an integrated car seat system as described herein.

In still a further advantageous concept, the present invention provides car seat designs for car seats that can be reversibly changed from one car seat type to at least one other car seat type. In this context, a booster seat, a forward facing infant seat, a rearward facing infant seat are said to be of a different 'type'. The word 'changeable' is used is used to mean changing from one 'type to another 'type. Thus a changeable car seat can be changed from a booster seat into either a forward facing infant seat, a rearward facing infant seat, or into both a forward and rearward facing infant seat.

A changeable car seat is said to have different states, each state being for a different type car seat and/or a different car seat configuration. FIG. 15A shows an example embodiment of a changeable car seat 1500. Car seat 1500 has at least two states, an open state and a closed state. FIG. 15A shows seat 1500 in its open state. Car seat 1500 includes a base 1540; a back made up of an upper back portion 1510 and a lower back portion 1520; a left side end 1535; a right side end made up of an upper right side end 1550 and a lower right side end 1552; a left side end 1530; and a leg portion made up of an upper leg portion 1560 and a lower leg portion 1570. In the embodiment shown these components are interconnected with hinges, each hinge being a coupling having at least two semi-fixed positions. Generally, it is desireable that some force is required to move a hinge from one semi-fixed position. Each hinge may be formed by a hinge pair as shown or as a single hinge. Left side end 1530 is connected to base 1540 by hinge 1535. Upper back portion 1510 is connected to lower back portion 1520 by hinge 1515. Upper right side end 1550 is connected to lower right side end 1552 by hinge 1555. Lower leg portion 1570 is connected to upper leg portion 1560 by hinge 1565. Upper leg portion 1560 is connected to base 1540 by hinge 1535. Upper back portion 1510 is connected to lower back portion 1520 by hinge 1515. Upper right side end 1550 is connected to lower right side end 1552 by hinge 1555. Lower leg portion 1570 is connected to upper leg portion 1560 by hinge 1565. Upper leg portion 1560 is connected to base 1540 by hinge 1545. Hinges 1535 and 1555 have two open positions. One open position is when it is desired to keep both left and right side ends in a vertical position. The other open position of hinge 1535 is to set left side end to shift towards the left as shown. The other open position of hinge 1555 is to set right side end to shift toward the right as shown. Similarly, it is advantageous to provide at least two open positions for hinge 1545. In one open position the upper leg portion 1560 is an in-line extension of base 1540. In another open position the upper base portion 1560 is in a general perpendicular position with respect to base 1540. Hinge 1565 has two semi-rigid open positions. In one open position; lower leg portion 1570 is an in-line extension of upper leg portion 1560. In the other open position lower leg portion 1570 is in a general perpendicular position with respect to upper leg portion 1560. In these open positions seat 1500 provides seating for an infant. It is noted that not all the components are used in all embodiments. Thus, for example in many embodiments upper leg portion 1560 and lower leg portion 1570 are not used.

It is noted that use of a hinge is just one of many embodiments. The word hinge as used herein is meant to illustrate a means of coupling components. It is understood that the word hinge refers to a coupling.or coupling mechanism. This could a hinge, a snap, a hook and eye, a strap, a bracing member, a material attachment and/or a combination of these or the like. Thus, in some embodiments some or all of the components are connected by a connecting material, hooks, snaps, zippers, braces and/or straps and any coupling device or method. This is in place of or in combination with using hinges. In some cases the components are held in a particular desirable position by metal or a suitable material.

In some embodiments of a changeable car seat when the seat is opened to be an infant seat, the seat can be selectively mounted as either a car seat in which the car seat user faces frontward or rearward. This is generally accomplished by provision of selective vehicle seat belt insertion into the changeable car. Other embodiments would also satisfy the concept of a changeable car seat.

Figure 15B:
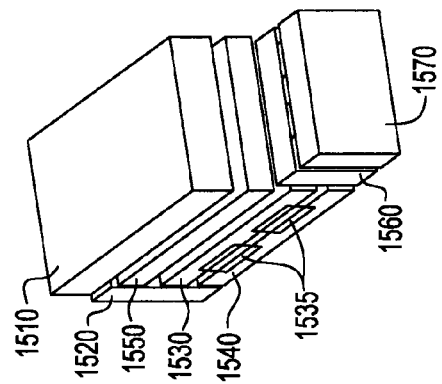
FIGS. 15A-B show an example embodiment of a changeable car seat in accordance with the present invention.
Figure 15A:
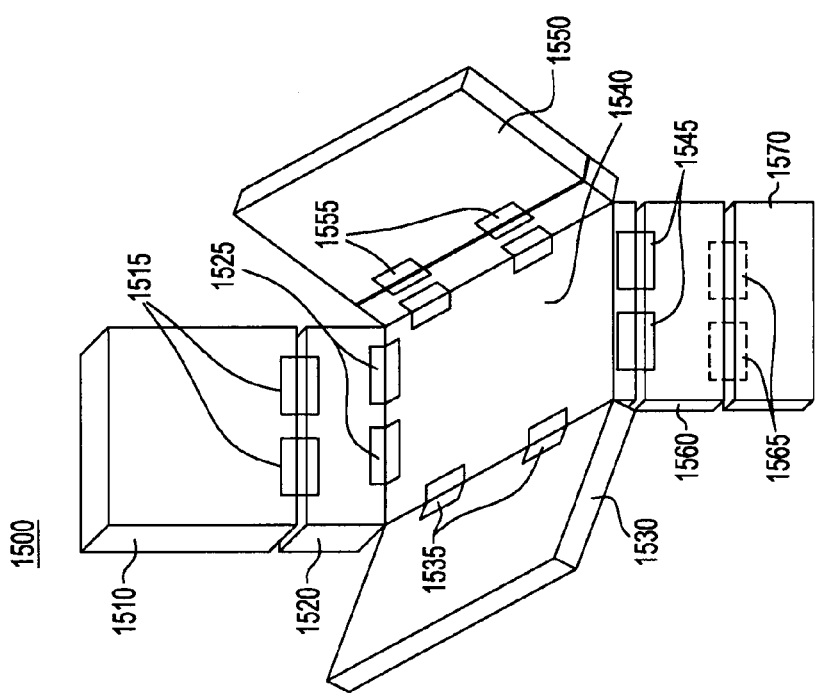

FIG. 15B shows set 1500 in a closed state. All the hinges (straps or material) are in semi-rigid position to form a booster seat. Some have a series of selectable positions to provide a choice of desired positions and/or sizes. It is noted that in these figures and many of the other figures in this invention, not all items are shown in the drawings. This done to provide simplicity, ease of viewing and understanding the specific concept intended to be shown. For example, the seat belts and attachment means connected to base 1540 are not shown.

In some embodiments the upper back portion is in open position shown in FIG. 15A with all the other components in their closed positions. This provides a novel seat back for a booster seat. The back also is sometimes formed with the base to combine in a way to provide a relatively flat portion for a small infant.

Thus, an advantageous embodiment of a changeable car seat includes: a base having a first, second, third and fourth side. The changeable car seat also includes a left side end coupled to the first side; a lower back, portion coupled to the second side; a lower right side portion end coupled to the third side; a upper leg portion coupled to the fourth side; and setting mechanism for forming an infant seat from the components in an open state, allowing formation of a booster seat. The components of the changeable car seat can be folded in a closed state together to form the booster seat. It includes a seat belt attachment allowing formation of either or both a forward facing and a rearward position. It sometimes includes a lower leg portion coupled to the upper leg portion opposite the base; an upper back portion coupled to the lower back portion opposite said base; an upper right side end coupled to said lower right side end opposite the base.

Other embodiments of the changeable car seat do not use all the components shown and are still included in this invention as using the concept of this invention. Changeable seat components are sometimes held in a particular new or old state or desirable position using straps, snaps, hooks and eyes, belts, braces, supporting braces and the like, or any combination of these.

In some embodiments, couplings are taken from any combination of couplings including: soft or semi-rigid material folding a pair of coupled changeable car seat component to be coupled in any of several desired positions; a hinge coupling; semi-rigid coupling. The coupling allows the changeable car seat to also be set as a booster seat. Sometimes some or all of the components of the changeable car seat are formed as an integral unit. These are also useable in some embodiments of the integrated car seat system for making seat members removably attachable.

Figure 16:
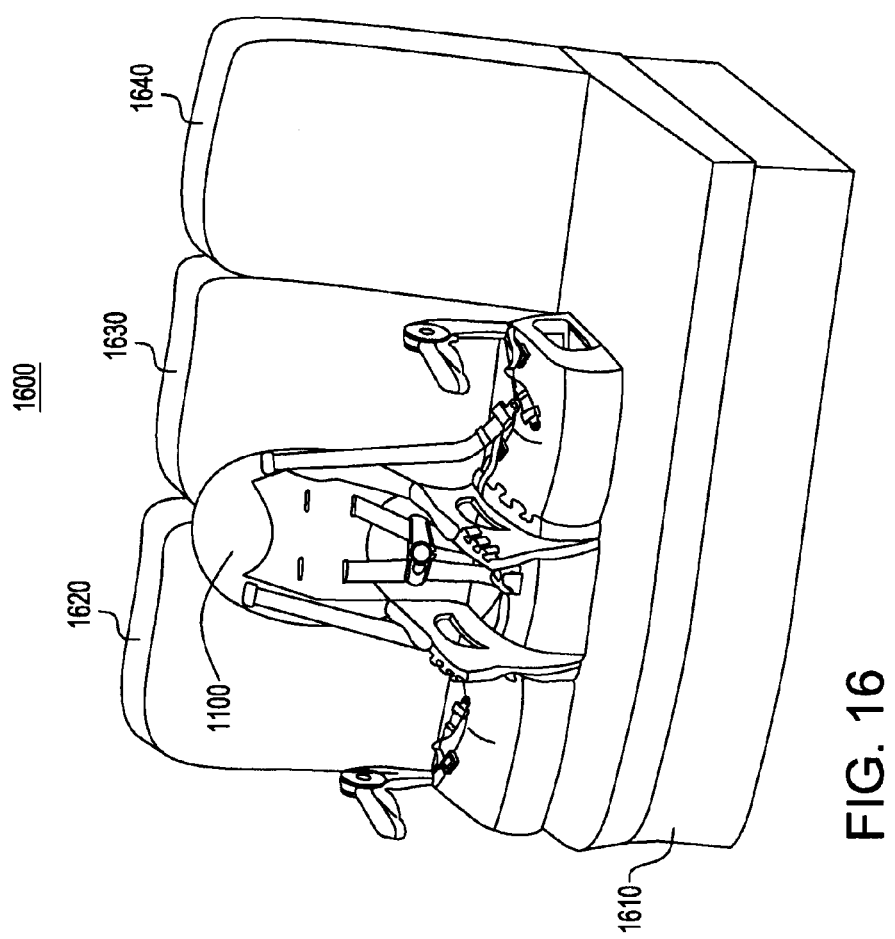
FIG. 16 shows an example of placement of a three car seat system into two vehicle seats in accordance with the present invention.

FIG. 16 shows an example 1600 of placement of a three car seat system for example, 1100 of FIG. 11, into two vehicle seats 1620, 1630 from three regular passenger seats 1620, 1630 and 1640.

As stated car seat 1100 may also be viewed as three individual car seats attached to each other or as a multiple car seat with three positions.

In an example embodiment the entire width of seat 100 is less than forty inches, which leaves adequate seating for a regular passenger in a vehicle seat 1640.

In same embodiment the car seat system or multiple car seat is designed to provide seating for four or five car seat users in the vehicle space width provided by vehicle seat 1620, 1630 and 1640. The concept of variable width car seat base is advantageously employed to provide useful widths for a particular mix of car seat users in a two, three, four or five position car seat system. The number of car seat user positions in a car seat system or a multiple car seat is only limited by available vehicle space width.

Figure 17B:
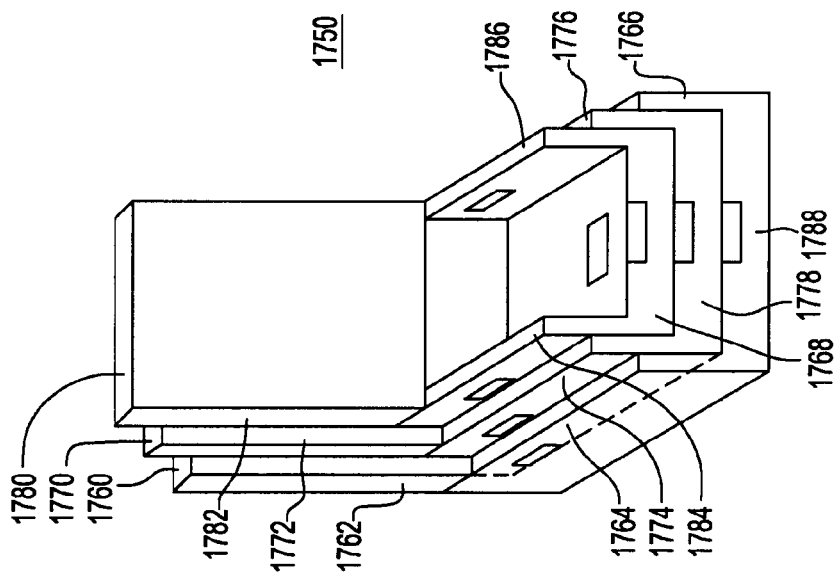
FIGS. 17A and 17B show example embodiments of integrated car seat systems in accordance with the present invention.
Figure 17A:
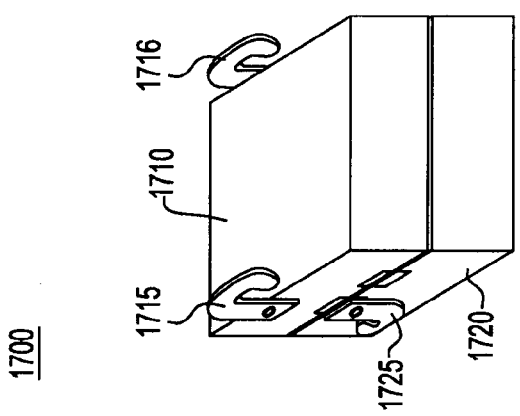
Figure 18:
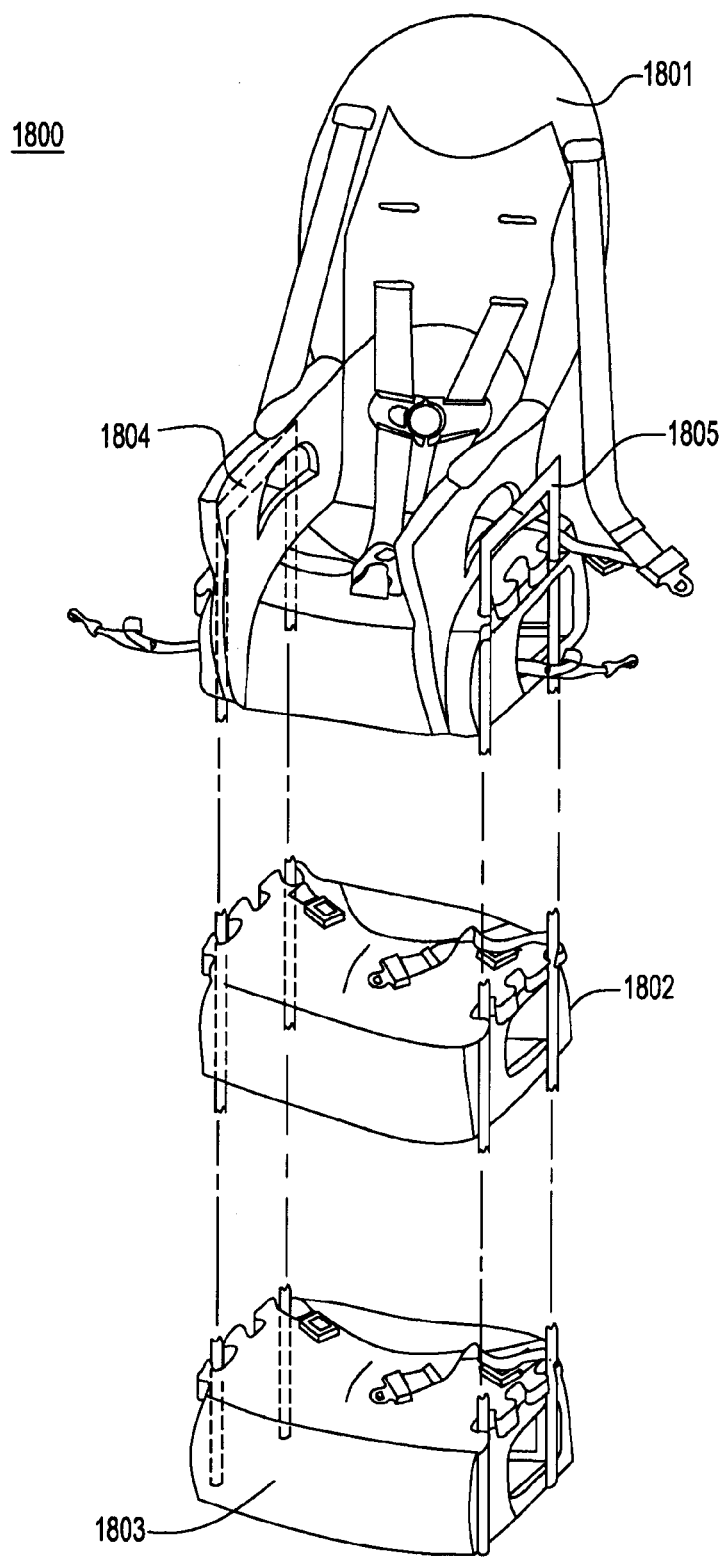
FIG. 18 shows another example embodiment of an integrated car seat system in accordance with the present invention.

FIG. 17A shows an example of an integrated car seat system 1700. An integrated system integrates and brings together car seat components for two or more car seats in a single package being an integral unit. FIG. 17A shows integration of two booster seats 1710 and 1720. Seats 1710 and 1720 are kept and held together when system 1700 is used for a single car seat user. When needed for two car seat users, seats 1710 and 1720 are separated. In same embodiments seats 1710 and 1720 are physically separated. A further example of an integrated car seat system 1800 is described later as shown in FIG. 18. In other embodiments they unfold from one another to form adjacent car seats. Examples of car seats that unfold from one another are shown in FIGS. 19 and 20 and are described subsequently.

Seat 1710 shows an upper booster seat, with belt seat attachments 1715 and 1716. Seat 1720 shows an lower booster seat 1720, with seat belt attachment mechanism 1725 in a lowered position. In some embodiments seat 1710 and/or seat 1720 form infant seats having attachment mechanism 1715, 1716 in an up position particularly useful for a forward facing or a rearward facing infant seat.

FIG. 17B shows an example embodiment of a three position integrated car seat system 1750 allowing a single package to hold three infant seats 1760, 1770 and 1780.

In the embodiment shown, seat 1760 has a back portion 1762, side portions 1764 and 1766 and base portion 1768. Seat 1770 has a back portion 1772, side portions 1774 and 1776, and a base portion 1778. Seat 1780 has a back portion 1782, side portions 1784 and 1786, and a base portion 1788.

Seats 1760, 1770 and 1780 are formed in a single package to provide seating for a single car seat user in seat 1780. The seat to seat attachment mechanism is such to allow the seats to be separated from the integrated package to provide seating for two or three car seat users.

In some embodiment either seat 1760 and/or seat 1780 is a booster seat. As with all seat back to seat base attachments in some embodiments the back portions are inclined backward forming an obtuse angle with its base rather than in a vertical position forming a right angle with its base. This provides better seating for a small infant.

Many embodiments use a pad covering the back and base portions for seating comfort.

Each seat position making up an integrated car seat system is herein referred as a member seat. Each member seat has either or both, a capture mechanism to capture another seat member and/or an attachment mechanism to allow it to be captured by a capture mechanism of another member seat. The capture mechanism is coupled with a release mechanism to allow release of a captured member seat. These mechanisms may be formed in any capture/release mechanism known to those familiar with the capture/release art. The mechanisms may include simple or complex mechanisms or even force fit and or snap/unsnap release mechanisms. FIG. 18 shows an example of a three member integrated seat system 1800. It includes two individual booster seats 1801 1802 mounted under a forward facing infant seat 1803 to form the three seat integrated car seat 1800. Seats 1801, External components 1804 and 1805 hold seats 1801, 1802 and 1803 together to provide seating for one car seat user. In one embodiment components 1804 and 1805 are each formed as dual telescopic tubes providing a range of lengths for 1, 2 or 3 seat combinations of the 3 individual car seats used in the integrated car system of FIG. 18.

In a preferred embodiment all seat members of an integrated car seat are identical. Each seat is formed to be able to capture a member seat and also be captured by another member seat. Thus each member seat includes capture/release mechanism and attachment mechanism. This design allows the integration of many identical seats. This is generally limited by height and space consideration. In some cases a first car seat of the integral unit has only capture and release mechanisms to capture, release and recapture an integrated seat member.

Member seats of integrated car seat systems are removably attached using any known method for attachment, release and reattachment. These include force fitting, straps, snaps, springs, hooks and eyes, belts, braces, supporting braces and the like, or any combination of these.

It is noted that generally each seat in an integrated seat car system is a self contained car seat capable of being mounted in the vehicle seat to provide seating for a car seat user. In some case external hardware and/or components are used.

In another embodiment of an integrated car seat system, each car seat member seat is formed having a plurality of components. In this case, a member car seat includes a member seat base and a member seat upper portion. Sometimes a first member car seat is an integral car seat. Other times any member seat may be used as the first member car seat. All member seat base portions removably attached to the base of the first car seat are one on top of another, and all member seat upper portions are removably attached to the upper portion of the first member car seat.

Sometimes a member car seat base includes member seat right and left ends. Sometimes it also includes a portion to be formed as a back for a rearward facing car seat position. Sometimes the member seat upper portion includes a member seat back particularly when used as a forward facing car seat position. In some cases at least one of the member seat upper right and left ends and member seat back are folded within the member seat base and upper portion respectively to obtain a reduced package. This is shown in FIGS. 19 and 20 showing examples of integrated car systems 1900 and 2000, wherein individual car seats are mounted on top of one another in a manner that each is unfoldable to form a separate, sometimes adjacent, car seat.

Figure 19A:
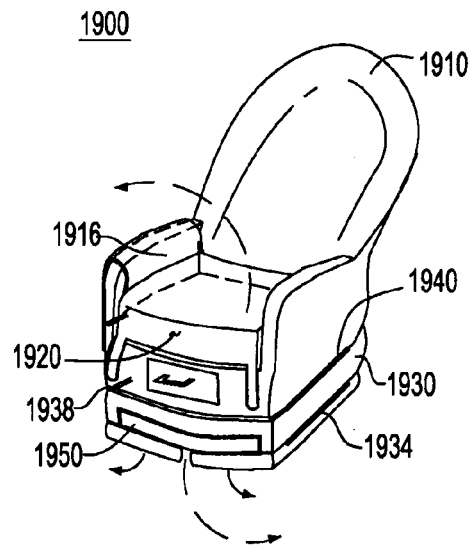
FIGS. 19A, 19B and 19C show an example embodiment of integrated car seat systems having car seats that unfold from one another in accordance with the present invention.
Figure 19B:
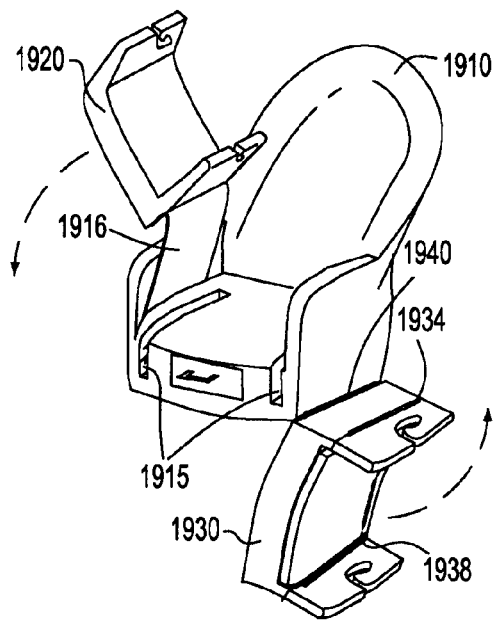
Figure 19C:
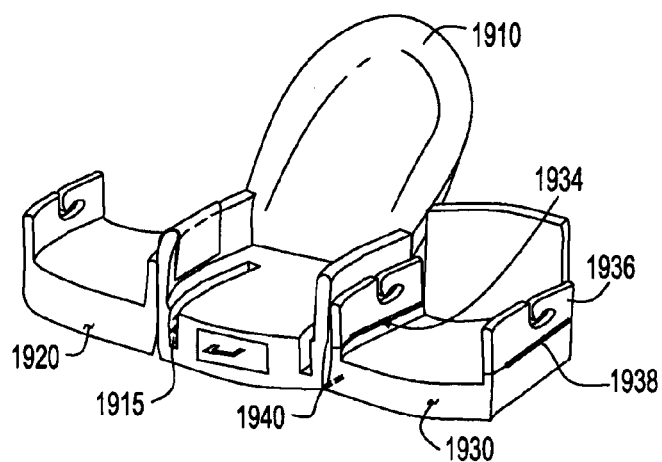

FIG. 19A shows booster seat 1920 mounted on top of infant seat 1910, with its sides inserted into groove pair 1915 of FIG. 19B. In FIG. 19A, infant seat 1910 is mounted on top of changeable seat 1930. As shown in FIG. 19B, seat 1920 is unfoldable from seat 1920 by unfolding flap 1916, and seat 1930 is unfoldable from seat 1910 by unfolding hinge 1940. Changeable seat 1930 is changeable from a booster seat without sides to a booster seat with sides by unfolding sides 1934 and 1938. FIG. 19C shows integrated car system 1900 in a completely unfolded instance In preferred embodiments, each seat is also detachable separately from the car system 1900.

FIG. 20A shows a changeable seat 2010 mounted on top of a booster seat 1920. The sides of seat 2010 are inserted into groove pair 2025 of FIG. 20B. In FIG. 20A, booster seat 2020 is mounted on top of changeable seat 2030. As shown in FIG. 19B, seat 2010 is unfoldable from seat 2020 by unfolding flap 2004, and seat 2030 is unfoldable from seat 2020 by unfolding hinge 2040.

Changeable seat 2030 is changeable from a booster seat without sides to a booster seat with sides by unfolding its sides using hinges 2032 and 2036. Changeable seat 2030 is further changeable from a booster seat without a back to a booster seat with a back by unfolding its back 2050. Changeable car seat 2010 is changeable from a booster seat without a back to a booster seat with either a half back or a full back by unfolding its back 2015 halfway or completely as shown in FIG. 20C. FIG. 20C shows integrated car system 2000 in a completely unfolded instance In preferred embodiments, each seat is also detachable separately from the car system 2000.

In some embodiments the first member car seat is a pre-existing, or to be manufactured car seat into which car members are packaged as disclosed in this invention. This in general, almost any particular car seat of any manufacturer and model can act as the first car seat of an integrated car seat system. This includes individual infant car seats, booster car seats and multiple car seats of any manufacturer. This is accomplished by adapting one or more integrated member car seats to be placed under the base portion and/or on top of the upper portion of the particular car seat. In some cases a two piece integrated car seat member is used with the member seat base being removably attached under the particular car seat and the member seat upper portions removably attached to an upper portion of the particular car seat.

In some embodiments of any of the car seat seats and/or systems, external mounting hardware and/or components are used for mounting one integrated car seat member to another and/or for mounting an individual removed car seat member to the vehicle seat.

Figure 21:
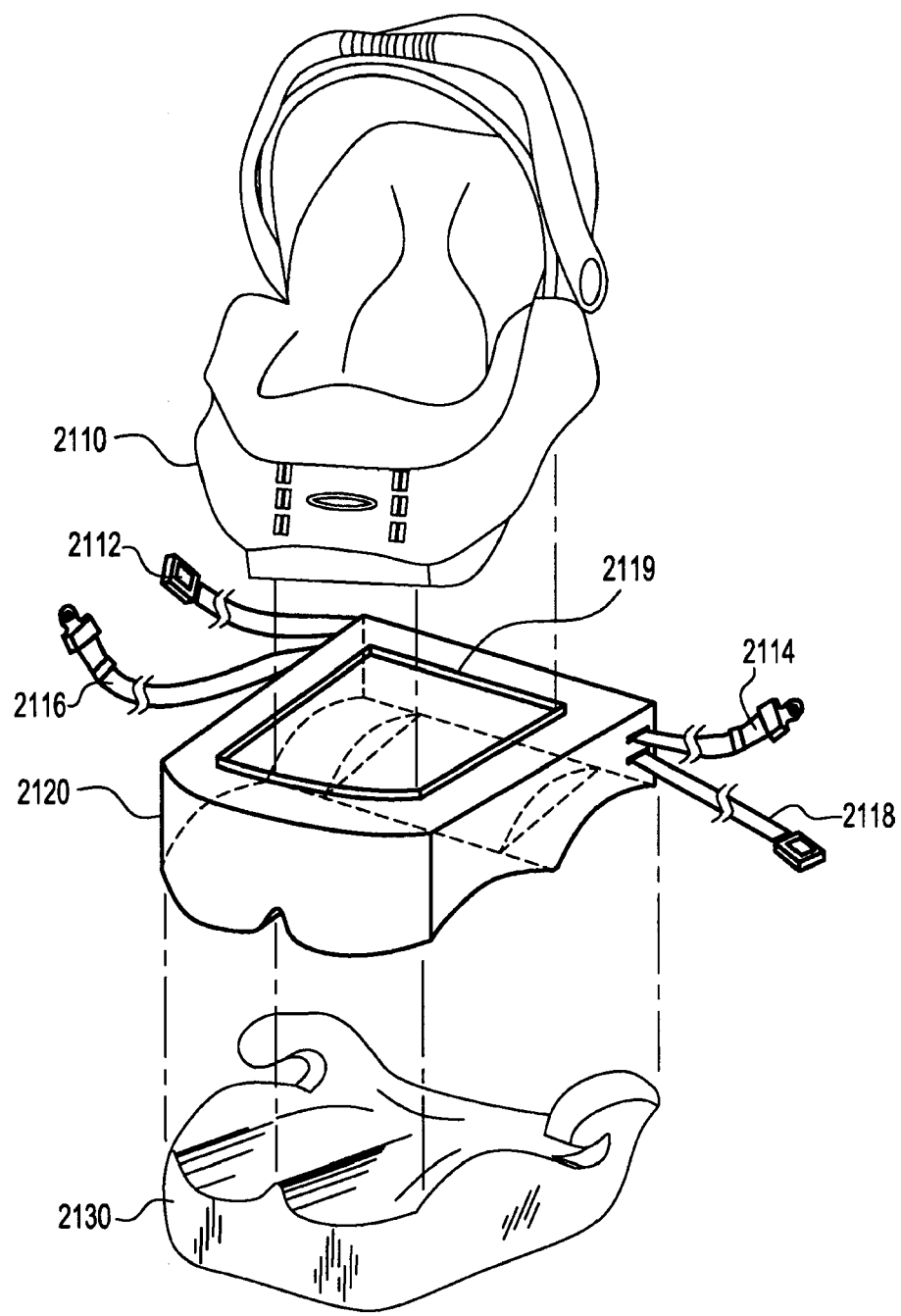
FIG. 21 shows an example embodiment of an integrated car seat system formed using a component to combine car seats in accordance with the present invention.

It is noted that generally any manufactured booster seat and any manufactured infant or other car seat can be made to accommodate one or more seats placed under or above that manufactured seats. FIG. 21 shows an example of an integrated car seat system 2100 formed by combining an example of a booster seat 2110, and an example of an infant seat 2130. Seats 2110 is mounted on top of seat 2130 using component 2120. Component 2120 is formed to fit in top seat 2130, and to provide a base to mount seat 2110 within a groove 2019. In some embodiments component 2120 is made up of other components. In the example shown, component 2120 includes two pairs of belts 2112/2114 and 2116/2118. Belt pair 2112/2114 is used to connect 2120 to seat 2110, and belt pair 2116/2118 is used to connect 2120 to seat 2130. Many embodiments of the various car seats described use a pad covering the back and/or base portions for seating comfort.

It is further noted that in many cases, individual car seat positions of a car seat in a car seat system, a multiple car seat and an integrated car seat system are often capable of receiving an attachable tray. The tray may be used for aiding child feeding and/or providing game and/or playing objects etc.

Generally, a single car seat is packaged as a single car seat to provide seating for a single car seat user. A multiple car seat is packaged as a plurality of car seats to provide simultaneous seating of a plurality of car seat users in seats adjacent to each other. An integrated car seat is packaged as a plurality of car seats atop one another. As initially packaged it provide seating for a single car a seat user. It provides additional seating for other car seat users only in seats that are removed from the initial integral package.

In some embodiments, there is a combination of multiple seats with integrated seats. For example lets consider at least one (or all) of the three seats multiple package shown in FIG. 11 may be an integrated package of three seats set on top of one another. This alleviates car seat storage problems when car seats are not all used. Thus a seat 1026 is a triple booster seat packages as a three high integrated seat, the multiple seat could provide ultimate seating for up to five or more car seat users, and so on.

In some embodiments the first member car seat is a pre-existing carseat, or to be manufactured car seat, into which car member car seats are packaged as disclosed in this invention. Thus in general, almost any particular car seat of any manufacturer and model can act as the first car seat of an integrated car seat system. This includes individual infant car seats, booster car seats and multiple car seat of any manufacturer. This is accomplished by adapting one or more integrated member car seats to be placed under the base portion and/or on top of the upper portion of the particular car seat. In some cases two piece integrated car seat members is used with the bases removably attached under the particular car seat and the member seat upper portions removably attached to an upper portion of the particular car seat.

In another embodiment of an integrated car seat system, each car seat member seat is formed to include a member seat base and a member seat upper portion. Sometimes a first member car seat remains in the integral unit. Other times, any member seat may be used as the first car seat. All member car seat bases are removably attached to the base of the first member car seat one on top of another, and all member seat upper portions are removably attached to the upper portion of the first member car seat one on top of another.

Sometimes, a member car seat bases includes member seat right and left ends. Sometimes it also includes a portion to be formed as a back for a rearward facing car seat position. Sometimes the member seat upper portion includes a member seat back particularly when used as a forward facing car seat position. In some cases at least one of the member seat upper right and left ends and member seat back are folded within the member seat base and upper portion respectively to obtain a reduced package.

As previously stated, in some embodiments external mounting hardware and/or components are used for mounting one integrated car seat member to another and/or for mounting an individual removed car seat member to the vehicle seat.

It is noted that generally any manufactured booster seat and any manufactured infant car seat can be made to accommodate one or more seats placed under or above that manufactured seat. It is preferred to removably attach booster seats under any manufactured seat, especially when the manufactured seat is an integral multiple car seat. In this case, a number of member car seats are mountable under the multiple car seat. However, even in this case integrated member car seats may be mounted above any or all car seat positions in an integral or non-integral multiple car seat.

The novel car seat concepts described above may also be used together or separately in order to get the best advantage for a particular user requirement. The particular embodiments described and/or shown are to be considered as illustrating the particular concept and should not be considered to limit the concept to particular description and/or drawing. Thus, any embodiment using any of these concepts are included as being protected by this invention as claimed herein.

Thus, although this description uses words like 'car', 'vehicle', 'car seat', etc, it should not be limited by these words. This invention is similarly applicable to seating 'car seat users' in air, water and other land vehicles, etc. The singular car seats, car seat systems and multiple person car seats of this invention are applicable to booster seat and non booster seat combinations. The vehicle of the present invention may be any land vehicle, any air vehicle or any water vehicle.

It is still further noted that the particular implementations described above should only be considered as specific examples of enabling implementations of the concepts and novelties of this invention. Other implementations are also suitable to use the concepts of this invention to obtain the advantages of this invention. These include locations and types of support and attachment mechanism and/or the separator, the car seat sides, car seat insert and insert mechanisms, variable width seat backs and or seat bases of car seat centers and width control or setting mechanisms, and/or multiple person car seats, modularity of certain parts, car seat entities, dual car seats, etc. These and other implementations are similarly protected by the claims and concepts of this invention.

What is claimed is:

1. An integrated car seat system comprising:
an integral unit comprising any combination of stackable individual car seats and individual booster seats, each individual car seat having a seat base and a seat back, and each individual booster seat having a seat base, the combination of stackable individual car seats and booster seats forming a single car seat that seats a single car seat person employing a built-in seat belt of a vehicle, each of said individual car seats and booster seats being detachably connectable one on top of another or one individual car seat detachably connectable to at least one booster seat, the individual car seats and booster seats formed to provide seating for a single car seat person when each said individual car seat or booster seat is removed from said integral unit, said integral unit and each of said individual car seats and booster seats of the integrated car seat system being mountable in a vehicle seat.

2. An integrated car seat system as recited in claim 1, wherein when at least one car seat of said plurality of car seats becomes a removed car seat by being removed from said integral unit, said removed car seat is mountable on one vehicle seat of said vehicle such that when mounted in said one vehicle seat, each removed car seat provides another sitting position for another car seat person.

3. An integrated car seat system as recited in claim 2, wherein when any removed car seat is no longer needed to seat said another car seat person, said removed car seat is re-attachable to said integral unit.

4. A variable width car seat comprising:
a car seat base including:
a left base portion, and
a right base portion, said base portions being coupled together by a mechanism controlling the spacing of one base portion over the other base portion making the width of the combined left and right base portions variable, wherein said variable width car seat is formed to seat a car seat person in a vehicle seat, the vehicle seat made to provide at least one sitting position for a passenger in the vehicle, said car seat system being mounted in said vehicle seat employing a built-in seat belt of the vehicle.

5. A variable width car seat as recited in claim 4, further comprising:
a car seat back including a left back portion and a right back portion, said back portions being coupled together by the mechanism controlling the spacing of one back portion over the other such that the width of the combined left and right back portions is variable;
said mechanism being one of: manual control, sliding control and gearing system control.

6. A variable width car seat as recited in claim 4, wherein said mechanism is one of: manual control, sliding control and gearing system control.

7. A variable width car seat as recited in claim 4, providing seating positions for at least two car seat persons.

8. A changeable car seat comprising:
a base, wherein said changeable car seat is formed to seat a car seat person in a vehicle seat, the vehicle seat made to provide at least one sitting position for a passenger in the vehicle, said car seat system being mounted in said vehicle seat employing a built-in seat belt of the vehicle;
a back including an upper back portion and a lower back portion;
a left side end;
a right side end including an upper right side end and a lower right side end;
a left side end; and
a leg portion including an upper leg portion and a lower leg portion,
wherein:
the left side end is connected to the base by a first coupling;
the upper back portion is connected to lower back portion by a second coupling;
the upper right side end is connected to lower right side end by a third coupling;
the lower leg portion is connected to upper leg portion by a fourth coupling;
the upper leg portion is connected to base by a fifth coupling;
the lower right side end is connected to base by a sixth coupling, wherein each coupling has at least a selectable open position and a selectable closed position, wherein a user is able to move a coupling from the open position to the closed position, and from the closed position to the open position, and wherein:

when all couplings are in respective open positions said changeable car seat provides a configuration for a first type of car seat, when all couplings are in respective closed positions said changeable car seat provides a second type of car seat, and when the first, third, fourth, and fifth couplings are in respective closed positions, and second and sixth couplings are in respective open position said changeable car seat provides a third type of car seat.

9. A changeable car seat as recited in claim 8, further comprising at least one of:

wherein each said coupling comprises semi-rigid flexible material imparted with at least two selectable positions;

wherein said first type is an infant seat, said second type is a booster seat, and said third type is a booster seat with a back;

wherein said base is a variable width base, and said changeable car seat forms at least one seat in one of: a car seat system, an integrated car seat system and a multiple car seat.

10. A changeable car seat comprising:

a base having a first, second, third and fourth side, wherein said changeable car seat module is formed to seat a car seat person in a vehicle seat, the vehicle seat made to provide at least one sitting position for a passenger in the vehicle, said car seat system being mounted in said vehicle seat employing a built-in seat belt of the vehicle;

a left side end coupled to said first side;

a lower back portion coupled to said second side;

a lower right side portion end coupled to said third side;

an upper leg portion coupled to said fourth side; and forming mechanism for forming an infant seat from said changeable car seat components.

11. A changeable car seat as recited in claim 10, further comprising:

a lower portion coupled to said upper leg portion opposite said base;

an upper back portion coupled to said lower back portion opposite said base; and an upper right side end coupled to said lower right side end opposite said base.

12. A changeable car seat as recited in claim 10, wherein all couplings are taken from any combination of couplings consisting of:

a foldable material coupling allowing folding of a coupled pair of changeable car seat components in a desired position;

a manual coupling;

a mechanical coupling;

a magnetic coupling;

a semi-rigid coupling;

an electrical coupling;

any combination of said couplings, and any coupling allowing said changeable car seat to be formed as one of: a booster seat, a forward directed car seat and a rearward directed car seat, a car seat for a handicapped car seat person, a car seat mountable on a rear of a particular vehicle car seat, a car seat capable of accepting a car seat insert, a car seat insert, a car seat with overlap, a variable width car seat, a car seat in a car seat system, and a car seat in a multiple car seat system.

13. A changeable car seat as recited in claim 10, wherein at least two components of said changeable car seat are formed as an integral unit.

14. An integrated car seat system as recited in claim 1, wherein at least one individual car seat is one of: a dual car seat, a car seat with overlap, a variable width car seat, a changeable car seat, a car seat insert, a car seat having receiving mechanism for a car seat insert, a car seat in a car seat system, and a car seat in a multiple car seat.

15. An integrated car seat system as recited in claim 1, forming at least one part of a multiple car seat system or a car seat system.

16. An integrated car seat system as recited in claim 15, wherein said multiple car seat or car seat system has two or more car seating positions, and at least one seat of said seating positions is formed of a plurality of car seats on top of one another.

17. An integrated car seat system as recited in claim 1, wherein at least one car seat of said plurality of car seats is one of: any existing car seat, a manufactured car seat, a modified car seat, and a car seat to be manufactured.

18. An integrated car seat system as recited in claim 1, wherein at least one car seat of said plurality of car seats is formed from a plurality of components including at least two components taken from a group of components consisting of:

an integrated car seat base;

an integrated car seat back attached to one of: said car seat back and a car seat base of another car seat of said plurality of car seats, an integrated car seat right end attached to one of: said car seat back and said car seat base; and an integrated car seat left end attached to one of: said car seat back and said car seat base, and wherein said at least one car seat of said plurality of car seats being formable to be one of: a booster seat, a forward directed car seat, a rearward directed car seat, a variable width car seat, a dual car seat, and an overlapping car seat, and wherein each car seat base is removable attached to another car seat base of said plurality of car seats.

19. An integrated car seat system as recited in claim 1, wherein each of said plurality of individual car seats comprises at least one of:

a capturing mechanism capable of capturing another seat of said plurality of individual car seats, an attachment mechanism enabling each said individual car seats to be captured by the capturing mechanism of another seat of said plurality of individual car seats, and a release mechanism enabling release of at least one individual seat from said another seat of said plurality of individual car seats and being removed from said integral unit.

20. An integrated car seat system as recited in claim 19, wherein each of said mechanisms comprise one of: a simple mechanism, a complex mechanism, an external component mechanism, a force fit, manual control mechanism, a sliding control mechanism, a gearing system control, and a snap/unsnap mechanisms.

21. An integrated car seat system as recited in claim 1, wherein at least one of said individual car seats comprises a release mechanism enabling release of each of said individual car seats from another of said plurality of individual car seats and being removed from said integral unit.

22. An integrated car seat system as recited in claim 1, wherein said integral unit further comprises a release mechanism to release any number of said plurality of individual car seats from said integral unit.

23. An integrated car seat system as recited in claim 1, wherein said each individual car seat is one of: an infant seat, a booster seat, a toddler seat, a variable width car seat, a forward directed car seat, a rearward directed car seat, a car seat for a handicapped car seat person, a car seat mountable on a rear of a particular vehicle car seat, a car seat capable of accepting a car seat insert, a car seat insert, a dual car seat, a car seat with overlap, a variable width car seat, a changeable car seat, a car seat in a car seat system, and a car seat in a multiple car seat system, and any combination of said car seats.

24. An integrated car seat system as recited in claim 1, being formed to be mounted in at least one of: a land vehicle, a water vehicle, and an air vehicle.

25. An integrated car seat system as recited in claim 1, wherein said built-in seat belt of the vehicle is a car seat mounting medium.

26. An integrated car seat system as recited in claim 1, wherein at least one individual car seat is removed from said integral unit by unfolding said individual car seat from said integral unit to form an adjacent car seat.

27. An integrated car seat system as recited in claim 1, further comprising at least one of:
  a car seat pad for covering at least one of a back and a base portion of at least one of said individual car seats;
  an external mounting component to mount at least one of said each said individual car seat to said integral unit, and
  an external releasing component to release at least one of said each said individual car seat from said integral unit.

28. An integrated car seat system as recited in claim 1, wherein at least one of said each individual car seats is formed having at least one external component.

29. An integrated car seat system as recited in claim 1, wherein at least one of said individual car seats of the integrated car seat system is an insertable car seat module comprising a receiving car seat of a first car seat type having receiving mechanism to receive a car seat insert of a second car seat type.

30. An integrated car seat system as recited in claim 29, wherein the car seat insert includes inserting mechanism to couple with said receiving mechanism and changing said first car seat type car seat to said second car seat type car seat, wherein said insertable car seat module is formed to seat a car seat person in a vehicle seat.

31. An integrated car seat system as recited in claim 29, wherein the insertable car seat forms at least one seat in one of a car seat system and a multiple car seat.

32. A car seat comprising a stackable car seat useful for an integrated car seat system, said integrated car seat system comprising a plurality of stackable individual car seats forming a single car seat that seats a single car seat person employing a built-in seat belt of a vehicle, said plurality of individual car seats being detachably connectable one on top of another.

33. A car seat system as recited in claim 32, formed to be mounted in at least one of: a land vehicle, a water vehicle, and an air vehicle.

34. A car seat as recited in claim 32, comprising at least one of:
  a capturing mechanism capable of capturing another seat of said plurality of individual car seats, and
  an attachment mechanism enabling said car seat to be captured by the capturing mechanism of another seat of said plurality of individual car seats.

35. A car seat as recited in claim 34, wherein each of said mechanisms comprise one of: a simple mechanism, a complex mechanism, an external component mechanism, a force fit mechanism, a manual control mechanism, a sliding control mechanism, a gearing system control, and a snap/unsnap mechanism.

36. A car seat as recited in claim 32, wherein said car seat is one of: an infant seat, a booster seat, a toddler seat, a variable width car seat, a forward directed car seat, a rearward directed car seat, a car seat for a handicapped car seat person, a car seat mountable on a rear of a particular vehicle car seat, a car seat capable of accepting a car seat insert, a car seat insert, a dual car seat, a car seat with overlap, a variable width car seat, a changeable car seat, a car seat in a car seat system, and a car seat in a multiple car seat system, and any combination of said car seats.

37. A car seat comprising at least one component to form a car seat into a stackable car seat useful for an integrated car seat system, said integrated car seat system comprising a plurality of stackable individual car seats forming a single car seat that seats a single car seat person employing a built-in seat belt of a vehicle, said plurality of individual car seats being detachably connectable one on top of another.

38. A car seat component as recited in claim 37, comprising at least one of:
  a capturing mechanism capable of capturing another seat of said plurality of individual car seats, and
  an attachment mechanism enabling said car seat to be captured by the capturing mechanism of another seat of said plurality of individual car seats.

39. A car seat component as recited in claim 37, wherein said individual car seat is one of: an infant seat, a booster seat, a toddler seat, a variable width car seat, a forward directed car seat, a rearward directed car seat, a car seat for a handicapped car seat person, a car seat mountable on a rear of a particular vehicle car seat, a car seat capable of accepting a car seat insert, a car seat insert, a dual car seat, a car seat with overlap, a variable width car seat, a changeable car seat, a car seat in a car seat system, and a car seat in a multiple car seat system, and any combination of said car seats.

40. A car seat component as recited in claim 37, wherein said individual car seat is formed to be mounted in at least one of: a land vehicle, a water vehicle, and an air vehicle.

41. A car seat component as recited in claim 37, wherein said component comprises hardware.

42. An integrated car seat system as recited in claim 1, wherein at least one of said plurality of individual car seats, provide features and amenities of previously known and developing car seats.

43. An integrated car seat system as recited in claim 1, wherein at least a portion of at least one of said plurality of individual car seats is folded within said plurality of individual car seats to result in a reduced package size.

44. An integrated car seat system as recited in claim 1, wherein external mounting components are used for at least one of: mounting one individual car seat or booster seat to another car seat or booster seat and mounting an individual removed car seat or booster seat to any vehicle seat.

45. An integrated car seat system as recited in claim 1, further comprising a car seat belt extender.

* * * * *